United States Patent [19]

George et al.

[11] Patent Number: 4,599,647
[45] Date of Patent: Jul. 8, 1986

[54] RECEIVER WITH INTERFACE FOR INTERACTION WITH CONTROLLER-DECODER

[75] Inventors: Ashok K. George, Toronto; John Jeffers, Downsview, both of Canada

[73] Assignee: General Instrument Corporation, New York, N.Y.

[21] Appl. No.: 548,357

[22] Filed: Nov. 3, 1983

[51] Int. Cl.[4] .................. H04N 7/167; H04N 7/16; H04N 1/34; H04K 1/00
[52] U.S. Cl. .................................... 358/122; 358/120; 358/121; 358/114; 358/115
[58] Field of Search ............... 358/121, 120, 122, 115, 358/114

[56] References Cited

U.S. PATENT DOCUMENTS

| | | | |
|---|---|---|---|
| 4,245,245 | 1/1981 | Matsumoto et al. | 358/121 |
| 4,325,078 | 4/1982 | Seaton et al. | 358/115 |
| 4,396,947 | 8/1983 | Cheung | 358/120 |

Primary Examiner—S. C. Buczinski
Assistant Examiner—Melissa Koltak
Attorney, Agent, or Firm—James & Franklin

[57] ABSTRACT

An interface permits bi-directional data signal transfer between the microcomputer of the receiver and an addressable controller-decoder designed for use in conjunction therewith. The data transfer permits expansion of the receiver functions and future adaptability to a variety of satellite services. The interface transfers messages from the microcomputer representing keystrokes received from the receiver keyboard and the status of the various receiver components and receives commands from the decoder for regulating the operation of the receiver components and for the transfer of specific information. The data transfer is achieved through a serial communication protocol which facilitates the interaction between units.

37 Claims, 15 Drawing Figures

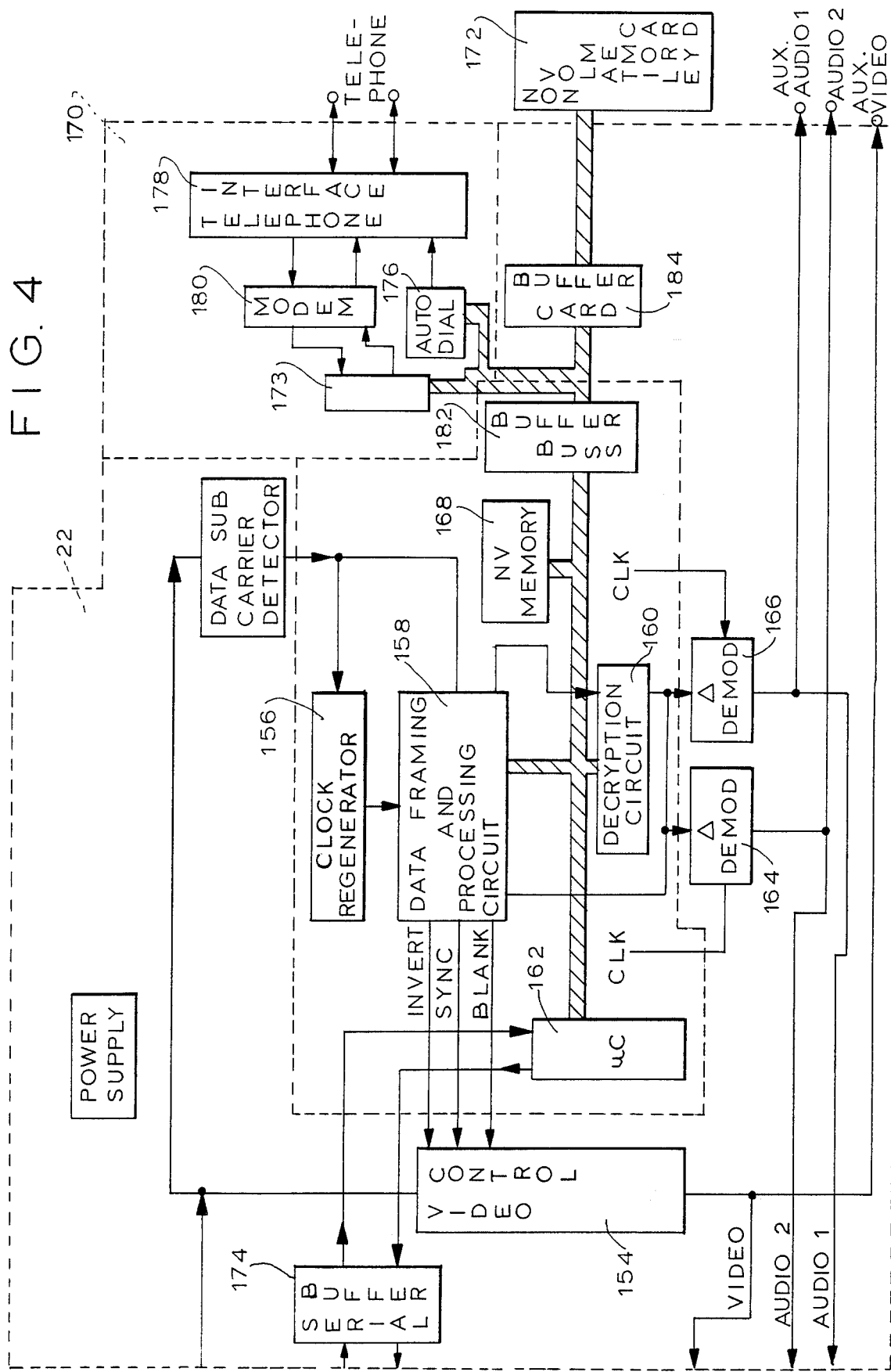

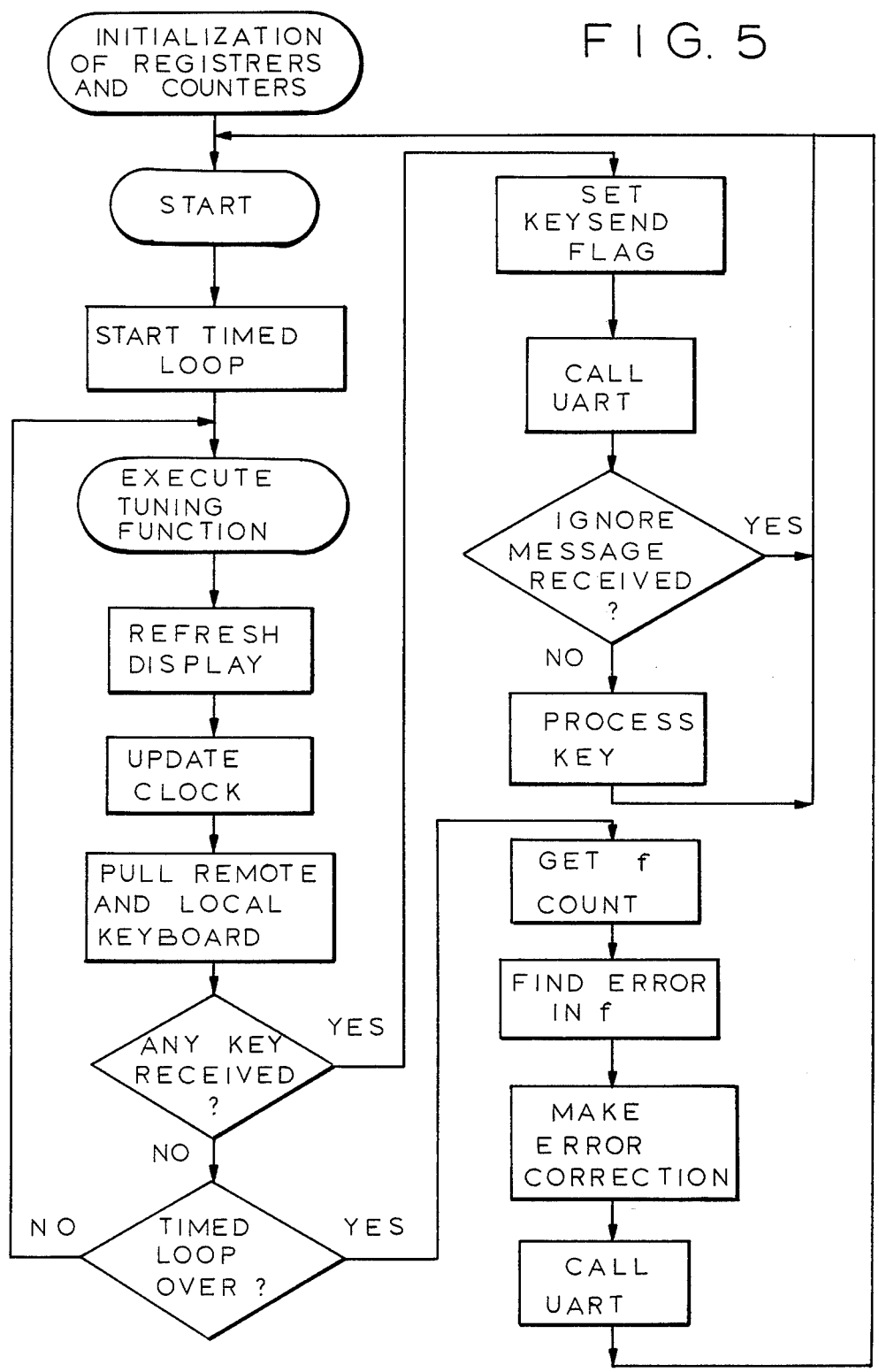

RECEIVER WITH INTERFACE FOR INTERACTION WITH CONTROLLER-DECODER

The present invention relates to a satellite signal receiver designed for use in conjunction with an addressable controller-decoder and, more particularly, to a means and a serial communication protocol for bi-directional data transfer between the receiver and the addressable controller-decoder.

The communications industry has recently undergone dramatic changes with respect to the quantity and types of programming available to the public. In addition to the conventional VHF and UHF commercial and public broadcast channels which distribute programming free of charge over the airwaves, many new programs have become available to subscribers who pay for the privilege of viewing same, either on a program-by-program basis, or on a subscription basis. In certain areas, this additional programming is distributed by means of cables which are connected to the individual residences of the subscribers who pay the various cable companies for this service.

However, the laying of cables requires a large capital investment on the part of the cable companies, a cost which is eventually passed on to the subscribers, and may be impractical in many rural and surburban areas. Consequently, an alternative broadcast method has been developed in which programming is beamed to orbiting space satellites which, in turn, broadcast signals to subscribers who possess the necessary equipment to receive the broadcasted signals and convert same for viewing on conventional television equipment.

For security reasons, the signals broadcast by the satellite are encoded or scrambled. Only receivers with the necessary decoding or descrambling capability can convert the broadcast signals for viewing on a television set. The subscribers pay for the ability to decode or descramble the received signals. Receivers without the decoding or descrambling capability are unable to utilize the signals, thereby preventing individuals from using the signals broadcast from the satellite without paying for the privilege.

In order to receive signals broadcast from the satellite, a dish-type satellite antenna is required. The signals received by the antenna, which is normally mounted on the roof of a residence or the like, are fed to an indoor satellite receiver which functions to select a particular program channel from the received signal and to remodulate selected signals for display on a conventional television connected thereto. Such a receiver includes input means, such as a keyboard or the like, through which the subscriber enters information concerning the programming which he/she desires to view, and tuning circuits which select the desired programming for remodulation.

If the received signals are encoded or scrambled, a decoder or descrambler circuit must be used in conjunction with the receiver to decode or descramble the signals so that they can be viewed. The decoder or descrambler must contain, or be capable of obtaining, the information necessary to perform the decoding or descrambling operation. The capability to perform the decoding or descrambling function can be stored in the equipment in the form of non-volatile memory, or can be conveyed to the controller-decoder by means of a two-way telephone link, an authorization card (similar to a credit card, which contains a non-volatile memory in which the authorization is stored) or by other means. Conveying the information needed for the decoding or descrambling function, instead of having same contained in the equipment, provides certain security benefits because it permits the programming originator to periodically change the code keys to further discourage unauthorized access to the programming.

The receiver contains hardware and software which enables it to perform certain functions, such as channel selection and tuning, display of channel numbers or time, volume control and muting of audio, parental control of the programming to prevent unauthorized viewing of certain programs by children or the like, and the setting of the internal clock means. These functions can be performed without the necessity of a decoder or descrambling circuit, if the received signal is not encoded or scrambled. A decoder or descrambler is required, however, if the signal is encoded or scrambled.

Since the functions of the receiver are established and set at the time of manufacture by the hardware and software contained therein, any receiver is apt to become obsolete in a very short time due to the rapid improvement and changes in satellite broadcasting occurring today. Such receivers lack the capability of modifying their functionality to adapt to new broadcast features or to accommodate changes in broadcast signals due to satellite equipment failure wherein, for example, one frequency must be substituted for another because a particular satellite transponder has malfunctioned.

One possible method of expanding the capabilities of the receiver is to design the receiver to accept additional programming through "plug in" Read Only Memory cartridges, similar to those commonly used in television game systems. However, this method has limitations as to the types of expansion possible.

The present invention is a broadcast receiver which can be used in conjunction with a controller-decoder which is capable of interacting with the controller-decoder in a way which results in modification or expansion of the capabilities of the receiver as broadcast signals become more sophisticated. Accordingly, the subscriber can use the same receiver in conjunction with controller-decoders of increasing complexity in order to provide increased or altered receiver functionality.

As described in detail below, the broadcast receiver of the present invention includes a bi-directional data transfer interface which permits the control means of the receiver to communicate with the controller-decoder in accordance with a preset serial communication protocol. Messages and commands can be transferred between the receiver and the controller-decoder such that the operation of the receiver can be altered and the capabilities thereof increased. As a result, the functionality of the receiver can be expanded, as increasingly sophisticated controller-decoders are used therewith, without the necessity of replacing the receiver each time the sophistication of the broadcast signals is increased.

It is, therefore, a prime object of the present invention to provide a receiver with an interface for interaction with a controller-decoder wherein the interface permits expansion of receiver features and future adaptability to a variety of satellite services.

It is another object of the present invention to provide a receiver with an interface for interaction with a controller-decoder which permits bi-directional data signal transfer in accordance with a preset serial communication protocol.

It is another object of the present invention to provide a receiver with an interface for interaction with a controller-decoder which has the capability of transferring data signals representative of the actuation of the keyboard input means of the receiver.

It is another object of the present invention to provide a receiver with an interface for interaction with a controller-decoder which includes means for transferring data signals representing status of the various receiver components.

It is another object of the present invention to provide a receiver with an interface for interaction with a controller-decoder which has the capability of receiving data signals representing control information intended to alter or expand the functionality of the receiver.

It is another object of the present invention to provide a receiver with an interface for interaction with a controller-decoder which has the ability to interact with various controller-decoders of increasing sophistication and capability.

In accordance with one aspect of the present invention, a receiver is provided for use in conjunction with an addressable controller-decoder. The receiver is adapted to be connected to an antenna for receiving broadcasted signals. The receiver includes means for tuning a given signal from the received signals, and means for modulating the tuned signal for viewing on a television. Input means are provided for generating input command signals in response to the actuation thereof. Display means are provided to display indicia representative of the various functions of the receiver. Control means are operably connected to the input means for receiving input command signals therefrom, and to the tuning means and display means to control same. The control means is capable of generating and receiving data signals relating to the function of the tuning means and the display means. Means, which are operably connected to the control means and to the addressable controller-decoder, are provided for bi-directional data signal transfer therebetween.

The control means comprises means for generating a synchronizing signal, means for transferring the synchronizing signal to the decoder, and means for waiting a given period to receive a data signal from the decoder. Means are provided for generating a data signal if none is received from the decoder during the waiting period.

The control means includes storage means for storing information relating to the tuning means and display means. Means are provided for accessing the storage means, obtaining the information therein and for converting same into a data signal.

Means are provided for storing the received signal in the storage means if a data signal is received from the decoder during the waiting period.

Means are provided for converting the data signal received from the decoder during the waiting period into a form suitable for storage and for storing same in the storage means. The stored information is thereafter used to control the functions of the tuning means and display means.

The data signal from the decoder may comprise a command to generate a particular data signal in response thereto. Means are provided for accessing the storage means to obtain the information stored therein and convert same into a form suitable for transfer to the decoder.

The data signals generated by the control means include data words which represent input commands or the status of the display means or of the tuning means. The data signals received by the control means include data words which are representative of a signal to be tuned by the tuning means, a setting for the display means, a command to generate a specific data signal, or a command to ignore a particular input command.

Each of the data signals comprises a data word including a start portion, a data portion, and a termination portion. Data signal transfer is initiated by the control means and, in particular, by the generation of a synchronization word by the control means and the transfer of same to the decoder.

Data reception by the control means occurs only when a data signal from the decoder is received within a given wait period after the generation of the synchronization word. Data transfer from the control means can commence subsequent to the wait period, if no data signal from the decoder is received within the wait period.

The data words generated by the control means are separated from each other by a waiting period, during which receipt of data signals from the decoder is possible. Thus, a particular serial communication protocol must be followed for the transfer of the data signals between the receiver and the decoder.

In accordance with another aspect of the present invention, a method of bi-directional serial data transfer between the control means of a broadcast receiver and the control means of an addressable controller-decoder is provided. The receiver includes input means for generating input commands in response to the actuation thereof, a tuning circuit, a display, storage means, transfer storage means, and a data transfer interface. The method includes the steps of generating a synchronization data word and loading the synchronization data word into the transfer storage means. After loading, the contents of the transfer storage means is transferred to the addressable controller-decoder through the interface. The control means of the receiver then waits a preselected number of bit periods. The control means generates a data signal if no data signal is received from the decoder during the waiting period. If a data signal is received during the waiting period, the signal is stored in the transfer storage means.

If no data signal is received during the waiting period, the control means will generate a data signal. For example, the control means may generate an error data signal, a data signal representative of an input command, a data signal representative of the number of the channel to which the tuning circuit is set, a data signal representative of the status of one of the components of the receiver, a data signal which indicates whether the channel number corresponding to an input command is a "favorite" or "non-favorite" channel number, or a data signal which is representative of the time as stored in the control means.

As each of the data signals is generated, it is loaded into the transfer storage means and transferred through the interface. Thereafter, the control means waits the preselected number of bit periods to determine if a responsive data signal has been received from the addressable controller-decoder. If no responsive data signal is received during the waiting period, a data signal may again be generated.

If a data signal is received within the wait period, it is stored in the transfer storage means. The received data signal can represent a command to tune to a particular channel number in response to an input command, a command to set the time stored in the storage means, a command to alter the status of certain components or modify the display, or a command to ignore a particular input command. On the other hand, the data signal can represent a command to generate and transfer a particular data signal, such as a data signal representative of the channel number setting, the status of the components, and indication of whether the channel number selected is a "favorite" channel or a representation of the stored time.

If the received data word in the transfer storage means represents a command to tune to a particular channel number, the control means decides whether the received data signal represents an acceptable channel number, that is, one which is greater than 0, but less than 100. If the channel number is not acceptable, an error signal is generated. If no error data signal is generated, the received data word is transferred to the storage means and is used to control the tuning means.

If the received data signal represents a time setting, the control means decides whether the data signal represents an acceptable time setting, that is, whether the minutes portion is less than 60 and whether the hours portion is greater than 0, but less than 13. If the data signal represents an unacceptable time setting, an error signal is generated. Otherwise, the data signal is converted into a binary coded decimal and transferred to the storage means and is utilized to set an internal clock means.

The storage means of the control means of the receiver includes a status register. If the received data signal represents a command to modify the status register, the data signal in the transfer storage means is transferred to the status register portion of the storage wherein it is utilized to update the status of the various components of the receiver.

If the received data signal constitutes a command to generate a specific data signal, the control means will obtain the necessary information from the storage means, convert it into proper form, and load it into the transfer storage means. Regardless of the nature of the received data signal, after processing by the control means of the receiver, the responsive data signal generated by the control means will be transferred only after the preset waiting period.

The above described serial communications protocol enables the broadcast receiver and the addressable controller-decoder to transfer messages and commands therebetween which will modify the operation of the broadcast receiver in order to alter or enhance the functionality thereof. Thus, the capabilities of the receiver can be greatly increased without the necessity of physically altering same.

To these and to such other objects which may hereinafter appear, the present invention relates to a receiver with an interface for interaction with a controller-decoder, as described in the following specification, and recited in the annexed claims, taken together with the accompanying drawings, wherein like numerals refer to like parts, and in which:

FIG. 4 is a block diagram of a typical addressable controller-decoder designed for use in conjunction with the receiver of the present invention;

FIG. 5 is a flow chart showing the main program for the basic functions of the receiver, implemented by the receiver control means;

Figure 6A:
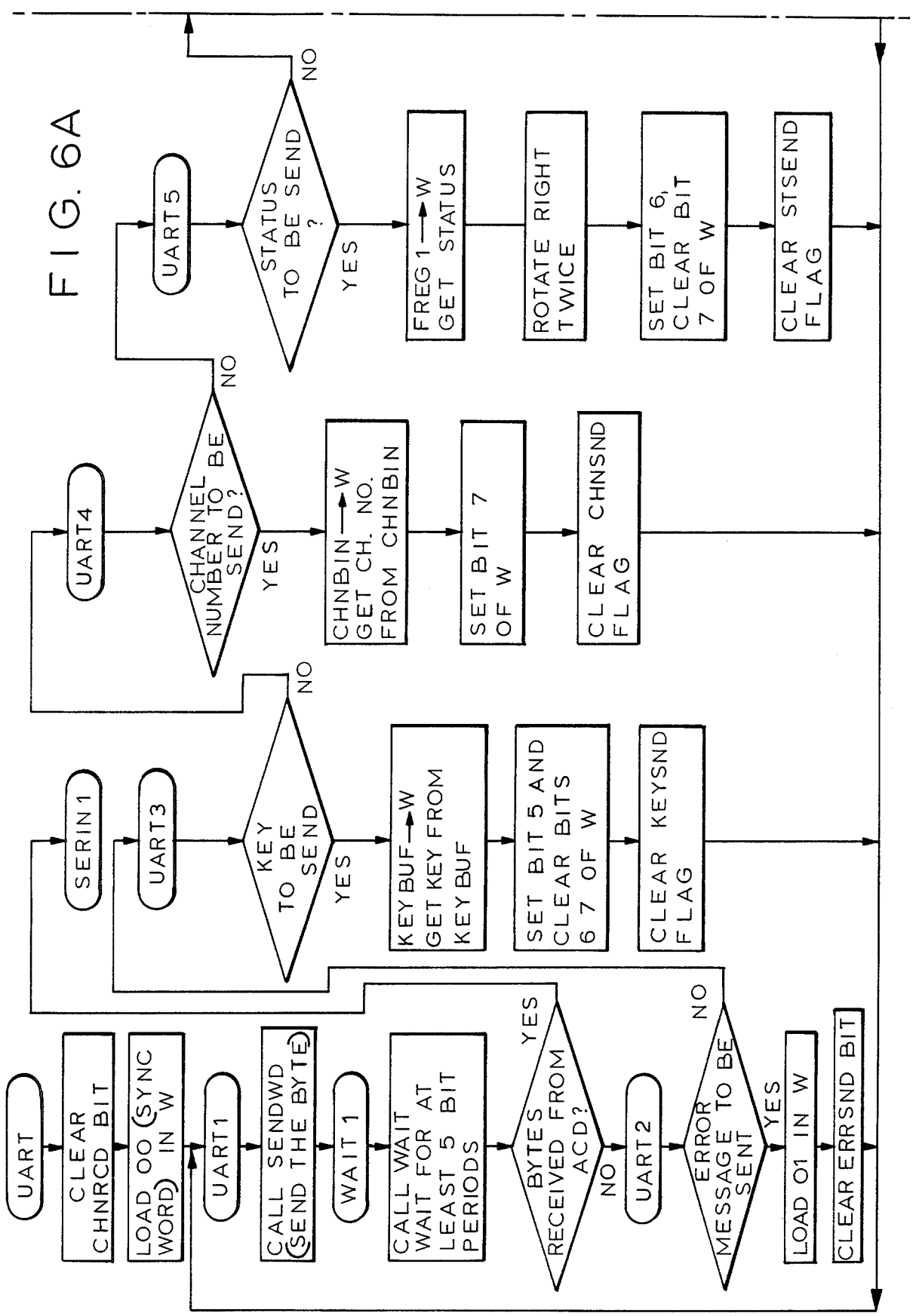
Figure 6B:
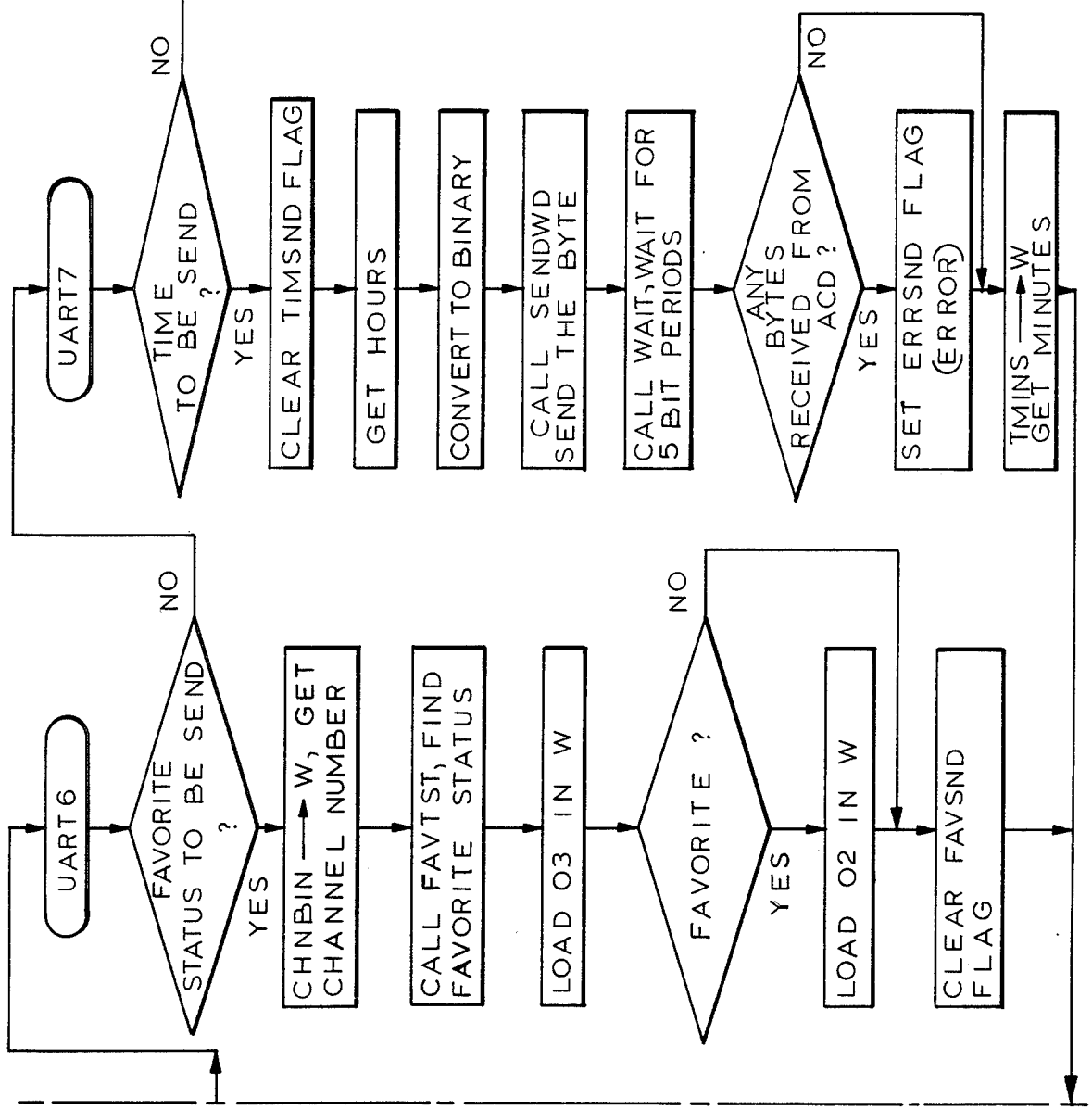
Figure 7A:
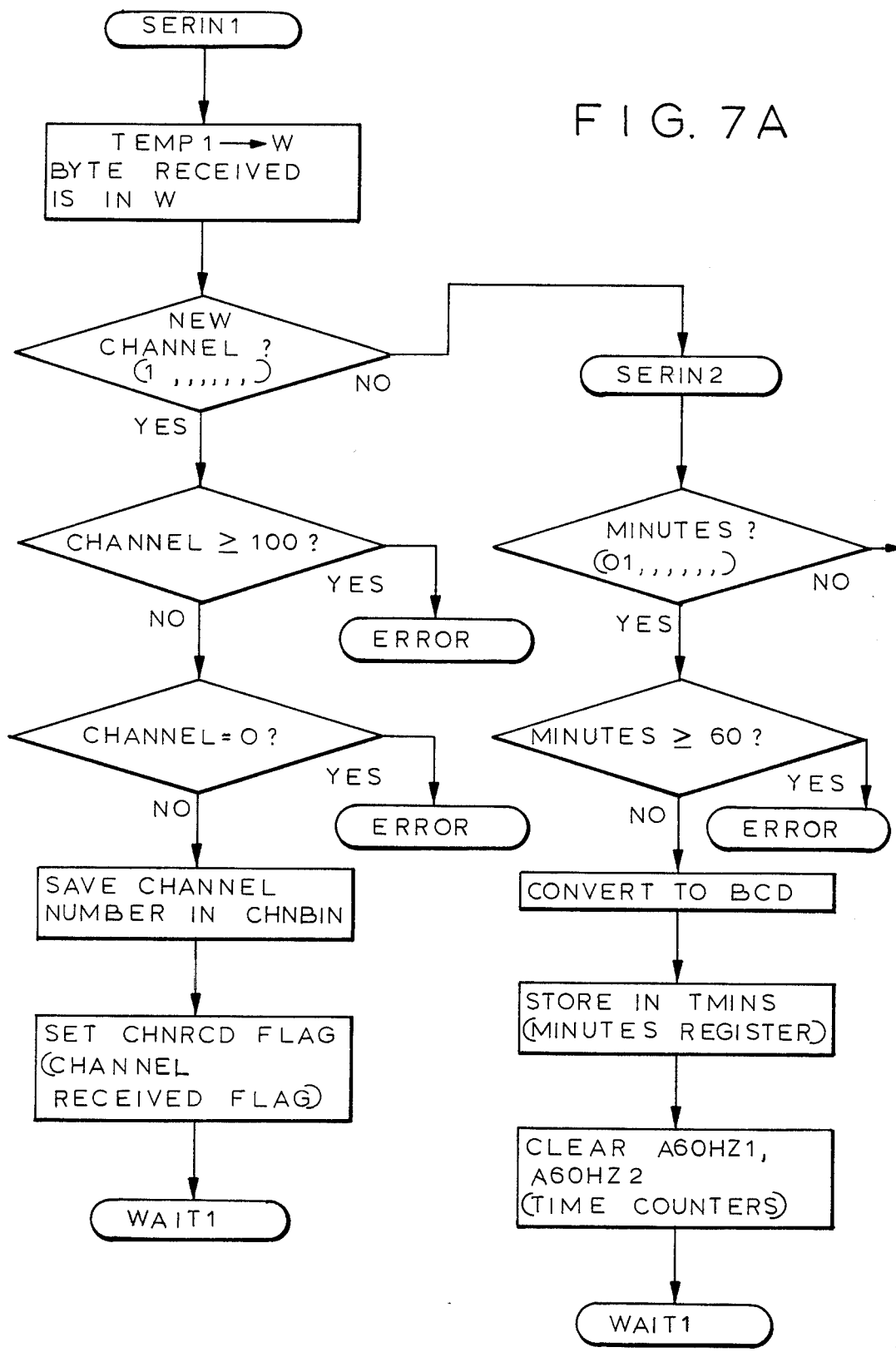
Figure 7B:
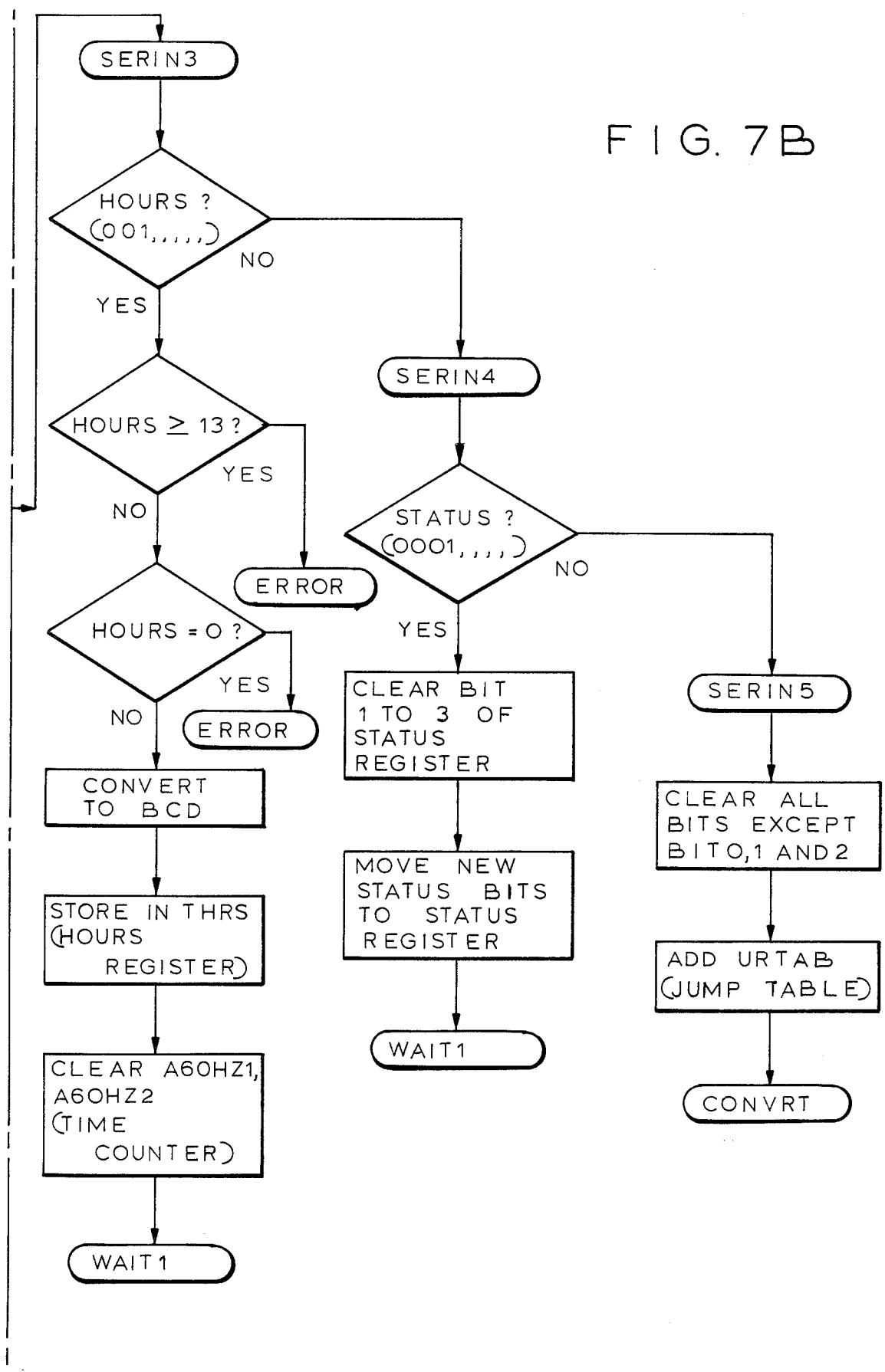
Figure 9:
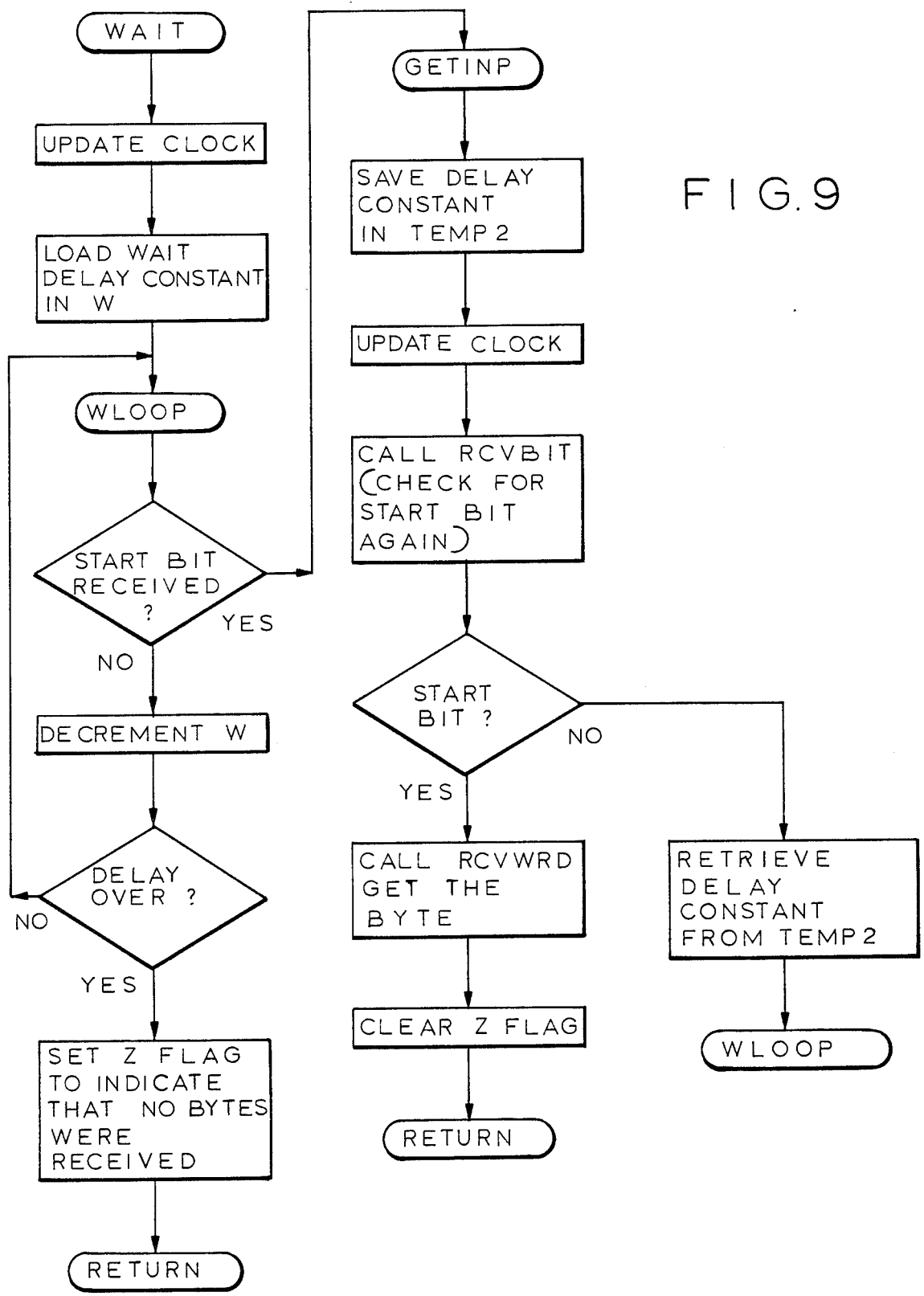
Figure 10:
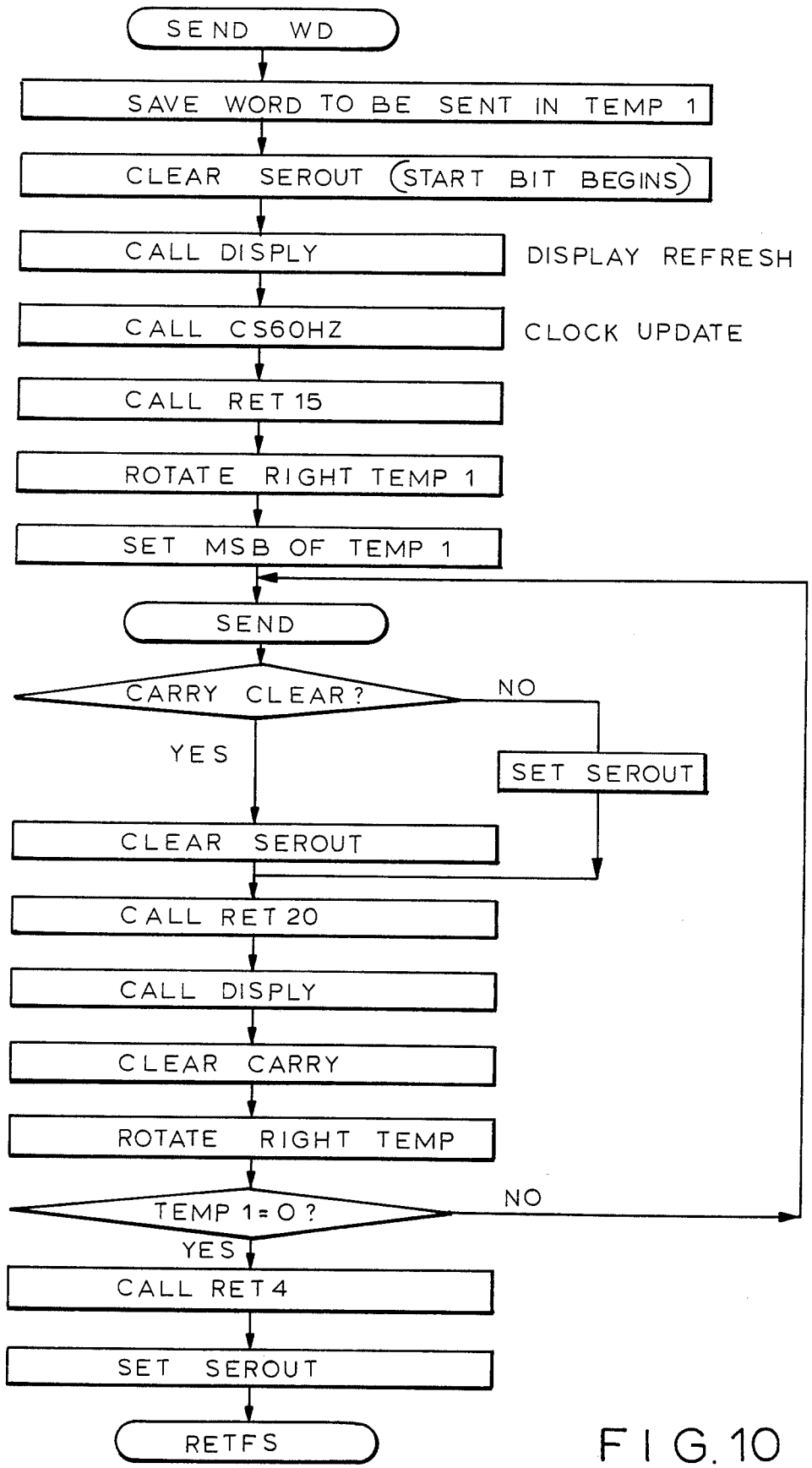

FIGS. 6A and 6B together form a flow chart of the serial communications output routine utilized by the receiver control means of the present invention;

FIGS. 7A, 7B and 8A, 8B are flow charts of several of the serial communications input routines utilized by the control means of the receiver of the present invention;

FIG. 9 is a flow chart of the sub-routine utilized by the control means of the receiver of the present invention to generate the wait periods;

FIG. 10 is a flow chart of a sub-routine utilized by the control means of the receiver of the present invention to cause the transfer of a data word.

Figure 11:
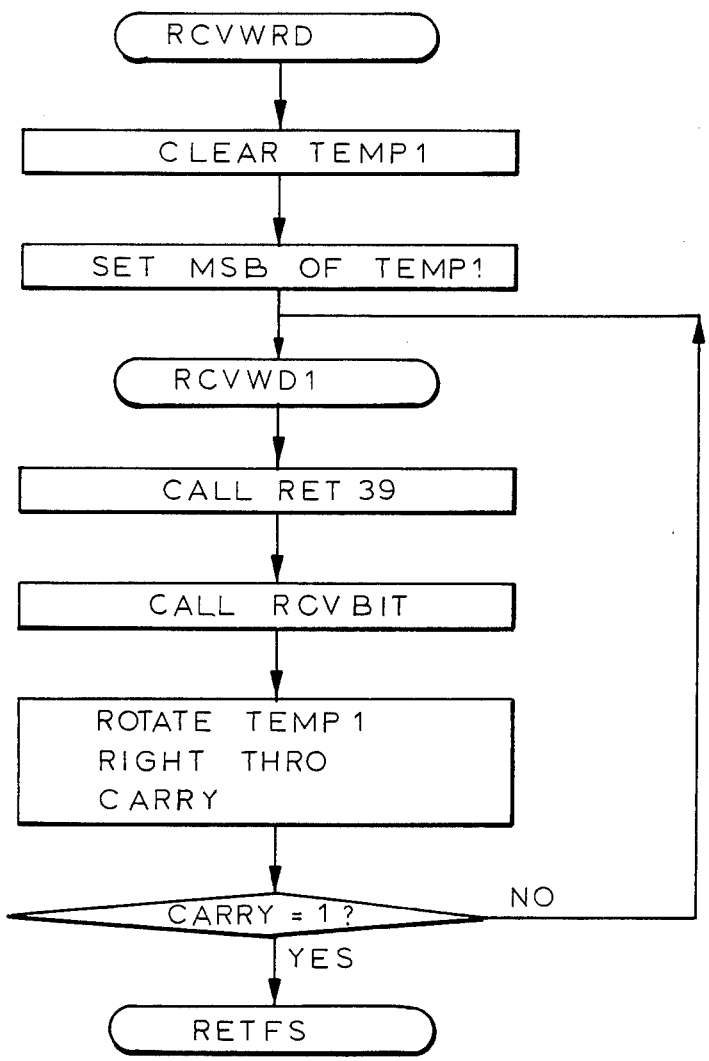
Figure 12:
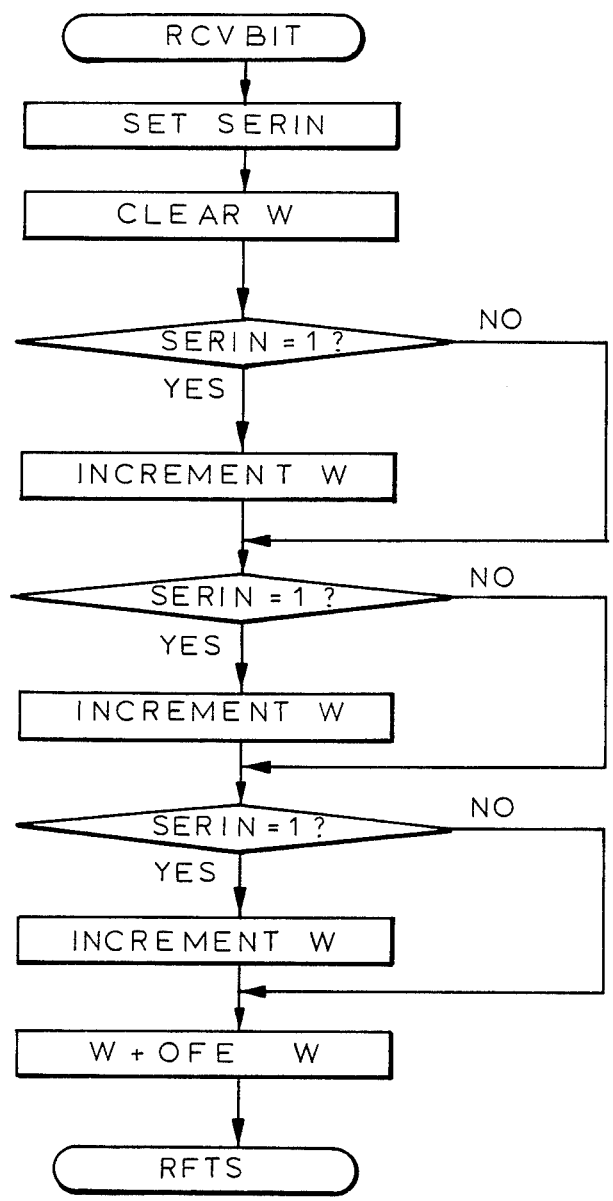

FIG. 11 is a sub-routine utilized by the control means of the receiver of the present invention to receive a data word; and FIG. 12 is a sub-routine utilized by the control means of the receiver of the present invention to receive a bit.

Figure 1:
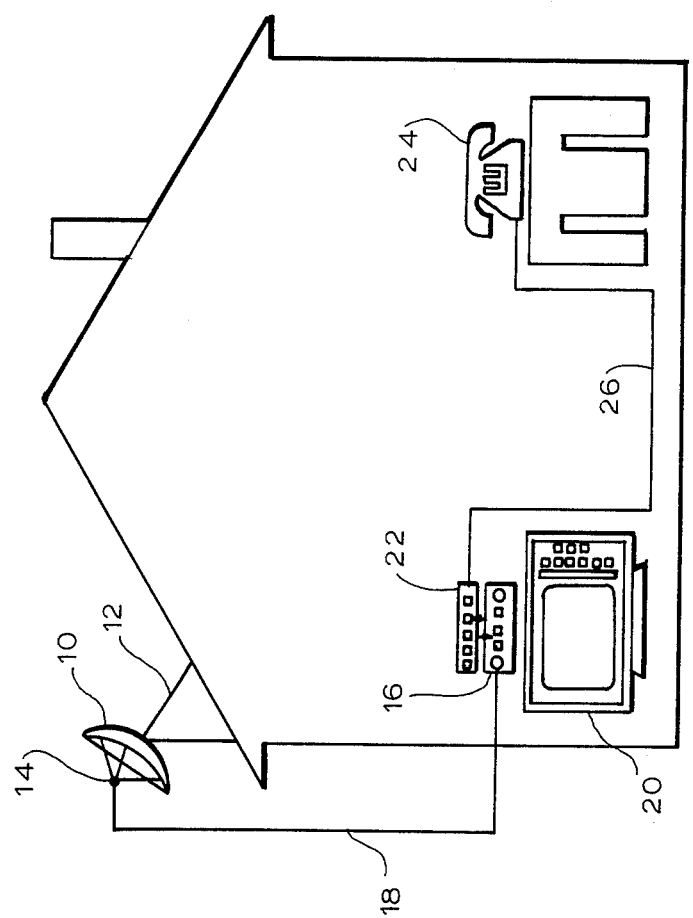
FIG. 1 is a schematic representation of the configuration of a typical home terminal including the broadcast receiver of the present invention and an addressable controller-decoder designed for use in conjunction therewith and for communication by means of a telephone link.

As depicted on FIG. 1, the configuration of a home terminal which includes the receiver of the present invention includes an antenna dish 10 mounted on the roof of a house or the like by means of a suitable antenna mount 12. Antenna dish 10 has a low noise block converter 14 mounted thereon. Converter 14 serves to convert the signals received by antenna dish 10, which may include a plurality of program channels, from a frequency of 12 Gigahertz to a lower frequency in the super high frequency range. Converter 14 is connected to the input of an indoor satellite receiver 16, by means of a co-axial cable 18. Receiver 16 is connected to a conventional television receiver 20. Receiver 16 is also interconnected with a plug-in addressable controller-decoder 22 by means of a communications interface described below. Decoder 22 is, in turn, connected to a telephone 24 by means of a cable 26.

Decoder 22 is designed for use in conjunction with the particular satellite system receiver described below. Decoder 22 accepts a scrambled video and an encrypted audio signal, together with authorization data from the receiver, in the form of a baseband signal. When authorized, the decoder unscrambles the video, decrypts the audio, and sends it in the form of a composite video and separate audio signals back to receiver 16. In receiver 16, those signals are remodulated onto a standard VHF TV channel and fed to the subscriber's television set 20.

The data signal communications interface between the receiver 16 and the decoder 22 transfers messages and commands between the receiver and the decoder. This permits the alteration and/or enhancement of the functions of the receiver.

The telephone line interface and a "non-volatile memory" card, described below, provide a return information path to the program originator. This path may be required for filing, statistical, and authorization purposes. The telephone interface and memory card also serve as an alternate means of input of authorization data.

Decoder 22 also has auxiliary video and stereo audio outputs to enable the subscriber to directly connect same to a video monitor, tape recorder, stereo set, or the like. Decoder 22 has a power cord to provide power to an internal power supply which is independent of the power supply of the receiver.

In addition to the normal subscription service provided to the subscriber, the receiver system may permit the subscriber to authorize the decoder to descramble a program that is not within the normal subscription service. This is accomplished when the subscriber presses the correct sequence of keys on the keyboard input. The time window during which the subscriber may sign up for the program is set by the system operator and consists of a preview time and the actual time of the show. All users may have the same preview time period at the beginning of the program, or the preview can be a certain time after the user tunes to the program.

The subscriber is notified that a program is available for authorization when the subscriber tunes to the particular program during the preview time or the show time. If the subscriber enters the necessary authorization information, the program will be descrambled so that it can be viewed.

The receiver system provides the subscriber with a method for preventing unauthorized viewing of scrambled programs. The subscriber has the option of recording a unique passcode which will then be required to authorize a program. The password is entered into the receiver by means of the keyboard and is stored in the receiver by a non-volatile random access memory. Thereafter, the pass code must be entered into the receiver to view a scrambled event.

The receiver-descrambler system also has a "parental control" capability which allows program blocking as selected either by the system operator or by the subscriber, this being provided by the addressable controller-decoder when it is connected to the receiver. The broadcasted signals contain a plurality of levels of programming called tiers. If a program is selected which is not suitable for family viewing, that is, is under the parental control function, the channel number will be displayed on the display with the appropriate indication of the parental control function. The picture will be scrambled and the audio silent. In order to view this program, the subscriber must enter the necessary parental control passcode in order to view the program. If the appropriate parental control passcode is not entered, the program will not be descrambled and cannot be viewed.

The subscriber makes a choice of which programming tiers to pay for by subscription. All other tiers are paid for on an "as viewed" basis. The programming originator may choose to block entirely the viewing of any tier by a particular subscriber. To do this, two tier tables are provided to the decoder. One table is the "subscription" list. The other is the "blocking" list.

If any program tier matches a tier in the subscription list, the program may be immediately viewed. If not, the display indicates that the program on the selected tier must be paid for and the subscriber may proceed to preview and pay for the program, if desired. If the program is on a tier which appears on the "blocking" list, it cannot be viewed.

The receiver system has a channel relocation feature which is a method by which the system operator may provide dynamic channel relocation to deal with such problems as interference to the satellite signal or a malfunction of a particular transponder in the satellite, such that a particular program must be broadcast on a different frequency than usual. In order to do this, the decoder will see if the channel selected is in the relocation table. If it is, the receiver is told to change the channel frequency. Up to sixteen channels may be placed in this list by the programming originator and may be changed at various times.

Figure 2:
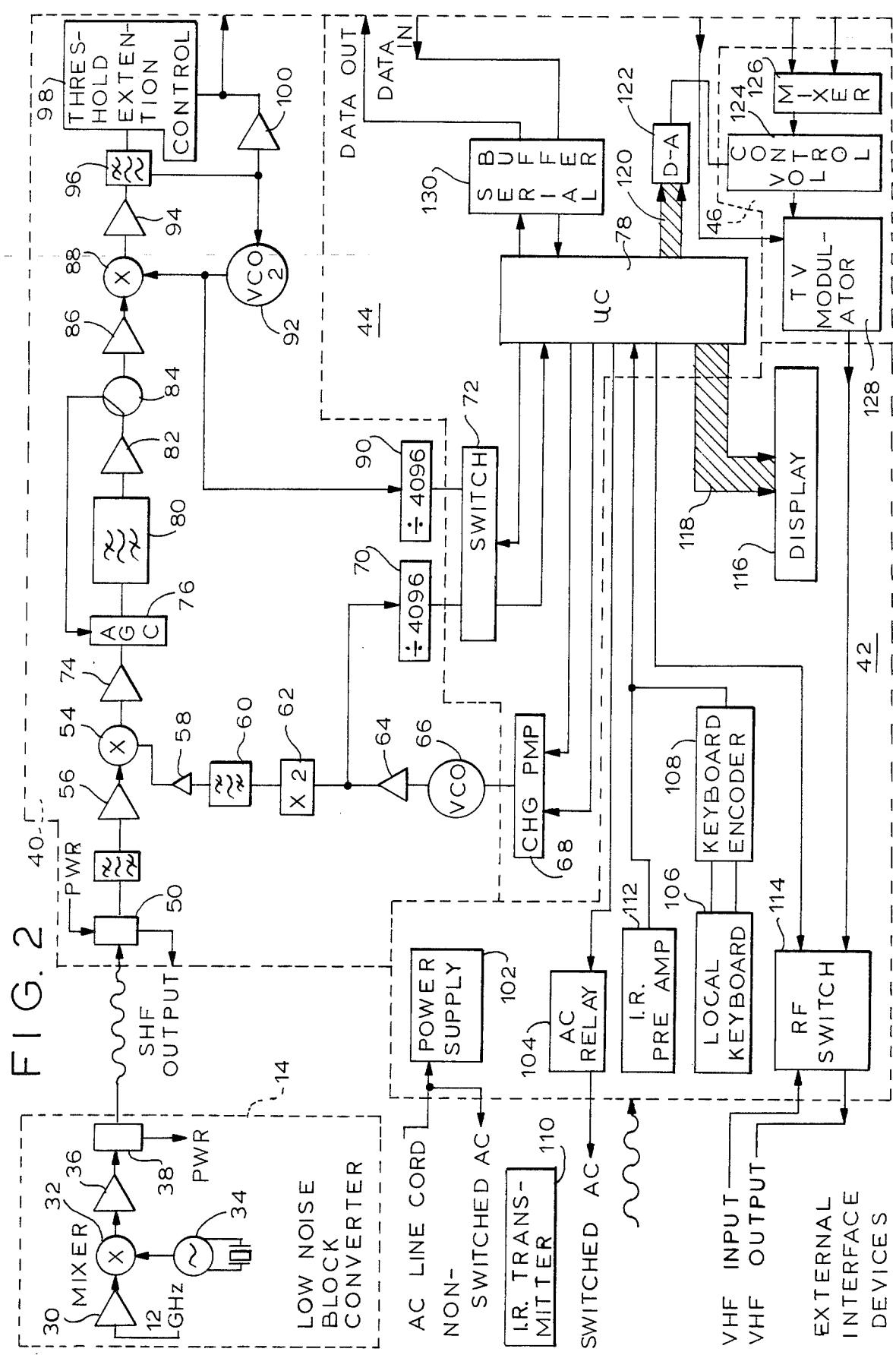
FIG. 2 is a block diagram of the receiver of the present invention, including the bi-directional data signal transfer interface.

As shown in FIG. 2, the low noise block converter, generally designated 14, accepts a 12 Gigahertz signal at the input of an amplifier 30. The output of amplifier 30 provides one of the inputs to a mixer 32. The other input to mixer 32 is a signal generated by an oscillator 34. The output of mixer 32 is transferred through a second amplifier 36 and a power circuit 38, and provides a super high frequency signal to the input of the tuning section, generally designated 40, of receiver 16.

Receiver 16, aside from tuning section 40, includes an input/output section 42, a control section 44, which includes the data communications interface, and a signal modulation section 46. All of these sections and the components therein are of conventional design, except for certain portions of the receiver tuning means, control means and the serial buffer described in detail below. For reasons of simplicity, the conventional components are described functionally only.

Tuner section 40 is of conventional configuration and includes an input amplifier 50 which is connected to the output of converter 14. Amplifier 50 is connected to a band pass filter 52, the output of which is connected to a mixer 54 through amplifier 56. The other input of mixer 54 is generated by a circuit which sets the intermediate frequency. This circuit includes an amplifier 58, a high-pass filter 60, and a multiply-by-2 circuit 62. The input of circuit 62 is received from an amplifier 64 which is connected to the output of a voltage controlled oscillator 66. Voltage controlled oscillator 66 is, in turn, connected to the output of a charge pump 68, located in the control section 44 of the receiver. The output of amplifier 64 forms the input to a divider circuit (divide by 4096) 70 which, in turn, is connected to the input of a switch 72, also forming a portion of the control portion 44 of the receiver.

The output of mixer 54 is connected through an intermediate frequency amplifier 74 to the input of an automatic gain control circuit 76. The output of AGC (automatic gain control) circuit 76 passes through band pass filter 80 and an additional amplifier 82 to a detector 84. Detector 84 is connected, by means of a feed-back loop, to the input of AGC circuit 76, The other output of detector 84 is connected to the input of an FM detection circuit through an amplifier 86. The FM detection circuit includes a mixer 88, which receives the output of amplifier 86. The other input to mixer 88 includes the output of a second voltage controlled oscillator 92 which is also connected to the input of a second divider circuit (divide by 4096), the output of which is connected to the input of switch 72. The output of mixer 88 is connected through an amplifier 94 to the input of a low pass filter 96 which also receives the output of a threshold extension control circuit 98. The output of low pass filter 96 provides the input for voltage controlled oscillator 92, as well as the input to an amplifier 100. The output of amplifier 100 is connected to circuit 98. The FM detector circuit is a phase locked loop of well known design and provides the base band signal.

The input/output section 42 of the receiver includes a power supply circuit 102 connected to an AC line cord and includes a non-switched AC output. An AC relay circuit 104, controlled by microcomputer 78, provides a switched AC output.

The receiver is provided with a keyboard circuit 106 connected to a keyboard encoder 108. A remote keyboard may also be provided on an infrared (IR) transmitter 110. The signal from IR transmitter 110 is received at an infrared preamplifier circuit 112, the output of preamplifier 112 and keyboard encoder 108 are fed to an input of microcomputer 78.

This section of receiver 42 is also provided with VHF input and VHF output connections through an RF switch 114. Switch 114 is connected to both microcomputer 78 and the output of the modulator portion 46 of the receiver.

Microcomputer 78 is connected to an LED display circuit 116 through a parallel bus 118. Display 116 displays the selected channel number, the time (as generated by a clock within microcomputer 78), and other indicia relating to the operation of the receiver and authorization to descramble certain programs.

An output of microcomputer 78 is also connected by a parallel bus 120 to a digital-to-analog converter 122 which, in turn, provides the input to a volume control circuit 124. Mixer circuit 126 receives the descrambled audio from the decoder 22 on two separate channels which will provide stereo or bi-lingual audio. The output of mixer circuit 126 is transferred through a volume control circuit 124 to a TV modulator 128. TV modulator 128 receives the descrambled video signal from decoder 22 and generates an output to RF switch 114 which will provide the necessary signals to a television set for viewing the descrambled program.

Figure 3:
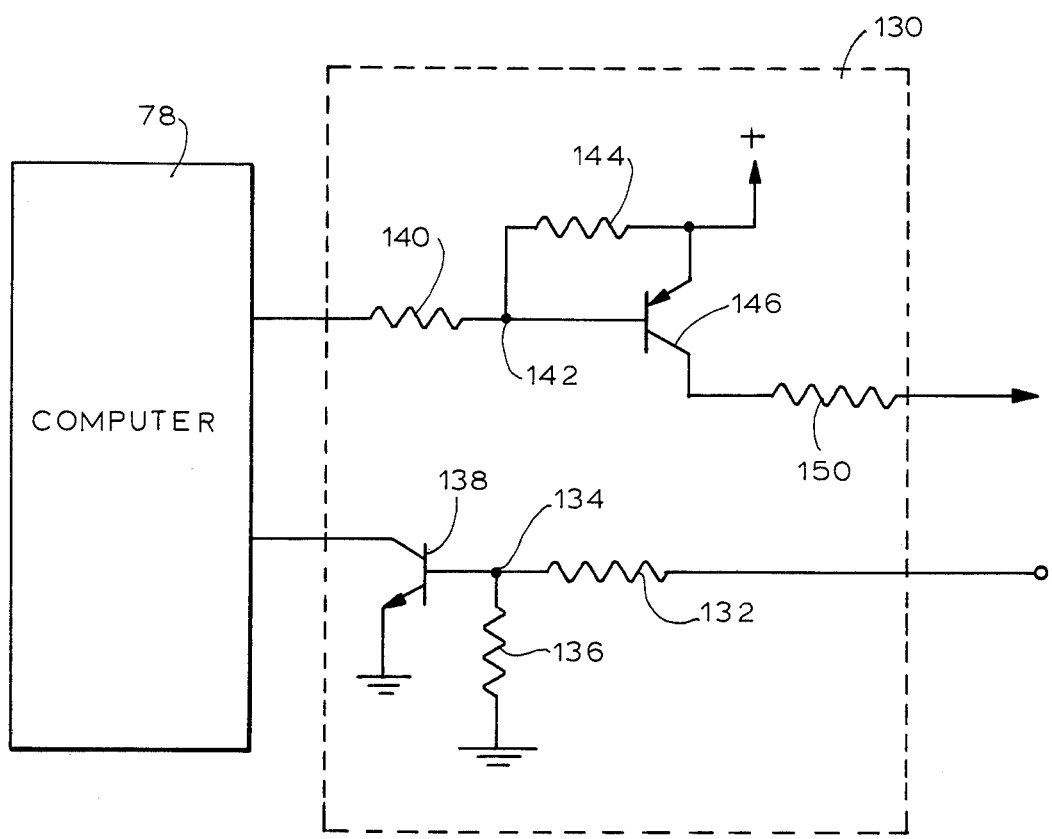
FIG. 3 is a schematic diagram of the bi-directional data signal interface of the present invention.

The receiver and, more particularly, the microcomputer 78 thereof, communicates with the decoder 22 through a serial buffer 130 which consists of the interface circuit, schematically represented in FIG. 3. The serial buffer 130 permits bi-directional data signal transfer between microcomputer 78 of the receiver and the micro-controller which regulates the operations of decoder 22.

Serial buffer 130 is of relatively simple design and consists of a serial data in-line, a serial data out line, and a signal ground line. The serial data in-line includes a voltage divider formed of a first resistor 132 (470 ohms) connected between the data signal output of the decoder and a node 134, and a second resistor 136 (330 ohms) connected between node 134 and ground. Node 134 is connected to the base of a transistor 138 which has an output circuit connected between ground and the data input of microcomputer 78. The data output of microcomputer 78 passes through a resistor 140 (3.3k ohms) to a node 142. Node 142 is connected to a 5 volt source (not shown) through a resistor 144 (4.7k ohms). Node 142 is connected to the base of a transistor 146, the output circuit of which is connected between the 5 volt source and a resistor 150 (100 ohms) which, in turn, is connected to the data input of decoder 22.

FIG. 4 illustrates a typical decoder 22 which could be used in conjunction with the receiver of the present invention. It should be appreciated that the decoder illustrated in FIG. 4 forms no portion of the present invention, but is depicted and functionally described herein for the purposes of illustrating the manner in which a decoder can interact with and control the functions of the receiver of the present invention. Decoder 22, as shown in FIG. 4, contains many of the components present in conventional decoders, but has the additional capability of communicating with the receiver microcomputer 78 in a way which permits it to alter and/or enhance the function of the receiver microcomputer 78 so as to expand the functionality of the receiver.

It should also be understood that the decoder 22 illustrated is designed to be modified and improved to expand the capabilities of the receiver as more sophisticated broadcast signals are provided. Thus, the description of the decoder is provided for illustrative purposes only, and is not meant in any way as a limitation on the present invention.

Data and scrambled video signals from the receiver tuning section 40 are supplied to a data sub-carrier detector circuit 152. The output of the receiver tuning section 40 also provides an input to a video control (descrambler) circuit 154. Data sub-carrier detector 152 processes the incoming signal and provides data to both a clock regenerator circuit 156 and a data framing and processing circuit 158. Data framing and processing circuit 158 separates the data and the audio streams. The data is checked to see if it is meant for the subscriber address. If so, it is provided for use by the decoder. Inversion synchronization and blanking data is always provided to video control circuit 154. The audio data stream is provided to the decryption circuit 160.

At the decryption circuit 160, the encrypted audio data stream and the decryption key provided by decoder micro-controller 162 are used to provide a "clear" audio data stream. This data stream is then clocked through two delta modulators 164, 166 to provide either two independent audio channels, or a single audio channel present on both outputs, as decided by micro-controller 162. The two audio channels are then buffered and provided to the receiver as audio 1, audio 2, and to the consumer at the auxiliary audio 1 and audio 2 outputs.

The baseband video input, which may be inverted and sync depressed, is provided to the video control circuit 154 and is used with the inversion, sync and blanking data to reconstruct a NTSC video signal from the baseband video. This NTSC video signal is supplied back to receiver 16 as the video output and to the subscriber as auxiliary video output.

A bus is provided to the peripherals of the micro-controller 162 which includes the data framing and processing circuit 158, the decryption circuit 160, and a non-volatile memory 168.

Micro-controller 162 regulates the functions of the decoder and all of the major functional blocks within the decoder are peripherals of the micro-controller. In addition, microcomputer 78 of the receiver can become a slave to micro-controller 162.

Micro-controller 162 is continually updating all information and storing away such things as viewer information, decryption keys, and the authorization data in NV memory 168. In addition, this circuit functions to update the clock in microcomputer 78 of the receiver.

All information such as decryption keys, descrambling enable commands, and the like, needing to be routed from one functional block within the decoder to another, is done under the control of micro-controller 162. Information concerning the actuation of the receiver keyboards and which channel number to which the receiver is tuned are sent to the decoder which may cancel each key stroke, change the channel tuned, update the receiver clock or change the display. At various times, micro-controller 162 may, through telephone communications circuit 170, dial up the billing center and dump all customer billing data. Alternatively, this circuit may dump all data into a non-volatile memory card 172.

One of the main functions of micro-controller circuit 162 is to obtain decryption keys by various methods. Codes can be sent to micro-controller 162 through the telephone or by means of memory card 172. Alternatively, the satellite may send a code to the micro-controller. Embedded in NV memory 168 is a unique secret identification, different from the receiver address. This identification, combined with the above-mentioned code information, will be processed by micro-controller 162 and a common key will be arrived at. The common key and other program information will form the decryption key which is fed to the decryption circuit 160.

All key stroke information derived from the actuation of local keyboard 106 or remote keyboard 110 of the receiver is sent to the decoder through the receiver interface 130 and a similar decoder interface, serial buffer 174, connected between interface 130 and micro-controller 162. In addition, the number of the channel to be tuned and responses to decoder commands are also sent. Commands from the decoder will cause various responses in the receiver, such as a change in the channel tuned, a change in the display, and the cancellation of a keystroke. Communications over the data interface are asynchronous at 8929 baud.

At various times, such as at the end of the billing cycle when the billing memory is almost full and at any other time the programming originator determines, the unit will telephone a computer center. This is accomplished by a telephone program circuit 173 connected to the micro-controller 162 through a bus buffer 182. The output of bus buffer 182 is also connected to an auto-dial circuit 176. Circuit 173 is connected to a telephone interface 178 by means of a modem 180. Microprocessor 162 will initiate the phone call by commanding an on-board modem 180 to check and see if the line is clear. If it is, modem 180 will pulse-dial a number through auto-dial circuit 176. When connection is made, micro-processor 162 will communicate via modem 180 with the computer billing center. When both authenticate each other, the billing information will be sent to the center and new decoding information may be sent to the decoder. If, at any time, the subscriber attempts to use the line, the decoder will abort and surrender the phone line.

The data sub-carrier demodulator 152 recovers binary NRZ serial synchronous data stream, which is BPSK modulated on a given megahertz sub-carrier at the rate of 755 kilo-bits per second. The digital information consists of time division multiplexed, encrypted digitalized audio data and authorization (addressable control) data.

The clock regenerator circuit 156 utilizes the detector's oscillator output and data transitions in order to regenerate properly synchronized data clock signals, as well as other clock signals and timing pulses used throughout the system. Thus, clock regenerator circuit 156 is able to take timing information from the broadcast signal and synchronize all of the components therewith.

The data framing and processing circuit 158 receives clock and serial data and performs several functions. Circuit 158 searches for stop and start bits framing each data word. It establishes bit synchronization for the data demultiplexing. It generates clock pulses for demultiplexing audio from authorization data. It also generates clock pulses for demultiplexing audio data into two separate channels. The audio data is clocked into a separate serial data stream. Authorization data is converted from serial into parallel form. Error detection and correction is applied to the parallel data.

This circuit also searches for data packet synchronization words. When found, it latches the global "tag" words for microcomputer 162 and its own use. It also searches for subscriber's address match. When found, it buffers the addressable data for use by microcomputer 162.

In addition, this circuit provides data word synchronization (start/stop bits) used to create timing pulses for video horizontal and vertical sync. Microcomputer data, latch tag data, and decrypted audio data are gated with timing pulses for video control.

One data word is received every horizontal TV line interval or every 63.5 microseconds. One audio data bit is received every 2.6 microseconds. This is at a rate of 189k baud for each one of two demultiplexed data channels.

The video control circuit 154 reconstructs standard composite video from a scrambled baseboard signal. The video could be scrambled by synchronization depression, scene change video inversion, field video inversion, or active video line inversion. Video inversion is done on a random basis, based on information taken from the digital data stream. Any one or none of the above methods could be used at a given time as indicated by the tag information.

The data framing and processing circuit 158 also provides video control circuit 154 with digital timing and control signals. The video control circuit 154 then reconstructs the video by performing the following functions: video sync recovery for DC levels shift, video inversion, and video differentiation to recover information necessary to generate a timing recovery waveform.

Decryption circuit 160 is a non-linear, self-synchronizing serial data decryptor. When loaded by a correct decryption key from microcomputer 162, it decrypts the audio data coming from the data framing and processing circuit 158 and sends the "clear" audio data to the delta demodulator circuits 164 and 166. The "clear" audio data is demultiplexed by properly phasing clock pulses originating at the data framing circuit 158 and applied to each of the two delta modulators 164, 166.

The delta modulators 164 and 166 are used to convert a digital data stream into an analog voltage resembling the original audio source. Two separate audio channels are provided for the purpose of stereo or bi-lingual broadcasts. In the case of stereo broadcasts, both audio channels are available at the auxiliary audio output connectors, but they are mixed into a single signal in the receiver before remodulation. In the case of bi-lingual broadcasts, the subscriber may select the language desired by the "audio" key on the keyboard. In the case of monaural unilingual broadcasts, both audio channels carry the same sounds.

Each unit has a unique identification code embedded in the non-volatile memory 168 on manufacture. The memory 168 is also used to store all authroization data, encryption keys, telephone numbers, and such things that will be required on a long-term basis for its address, as received by phone or satellite. All pay-per-view data is also stored in this memory for forwarding to the central office via the telephone link.

As most of the digital circuitry will be packaged on an encapsulated hybrid chip, security for all internal data paths will be blocked from the outside world by a tri-state bus buffer 184. This bus buffer will allow only the signals to drive the telephone link and the non-volatile memory card data to pass outside of the hybrid. This will afford some protection from external probing.

A card buffer circuit 184 is provided between the bus buffer 182 and non-volatile memory card 172. Card buffer 184 will provide all of the necessary circuitry to drive memory card 172. Memory card 172 is a card-like device which, when inserted into the decoder slot, will provide a means for communicating with the decoder via mail. If memory card 172 is used to collect the pay-per-view data, this card must be present to enable any pay-per-view viewing. In any case, the card will record the desired program tag and time of each subscriber pay-per-view authorization and authorize the decoder to provide descrambled programs to the subscriber.

Card 172 should contain a code to authenticate itself and to authenticate the decoder. Additionally, the card should be capable of delivering encryption keys and other data to the decoder.

FIG. 5 is a flow chart illustrating a typical main program for the major functions of microcomputer 78. Shortly after the microcomputer receives power from power supply 102, all of the shift registers and counters, including those dedicated for use in general information storage, data transfer storage, channel number information, status information, keystroke information, time information (including hours and minutes), favorite channel status information and error message information, are initialized. After initialization of the registers and counters, the functioning of the microcomputer 78 begins by starting a timed loop. The timed loop includes all of the main functions of the receiver.

For example, the timed loop begins with executing the tuning function in accordance with the channel number stored in the channel number register. During this time, the microcomputer causes the tuning portion of the receiver to select a frequency corresponding to the channel number in the channel register. After the tuning function is complete, the display is refreshed and the internal clock updated. After updating of the clock, the remote and local keyboards are polled to determine if a keystroke has occurred, that is, if one of the keyboards has been actuated such that a new channel number or other information has been entered. If no keystroke has been received during this period, microcomputer decides whether the timed loop is over. If it is not, the program returns to the portion of the timed loop and the timed loop is repeated.

If a new keystroke has been received, a location in the memory called "KEYSEND" flag is set to indicate that a new keystroke has been received. The program then calls the UART routine (Universal Asynchronous Receiver Transmitter), which is described in detail below, during which the microcomputer will communicate with the decoder. At the end of the UART routine, the microcomputer decides whether an IGNORE message has been received from the decoder. If it has, the microcomputer will ignore the keystroke and return to the START of the timed loop. If no IGNORE message is received from the decoder, the microcomputer will proceed to process the keystroke. After processing of the keystroke, the timed loop will be started again.

If a decision is made that the timed loop is over, the microcomputer will obtain the frequency count from the tuning portion of the receiver, it will then find any error in the frequency and make the suitable error correction. After the error correction is made, the UART routine will be called. During this time, the microcomputer will communicate with the decoder by sending various messages to the decoder and receiving various commands from the decoder, as described in detail below. After the UART routine has terminated, the timed loop will be started again.

While there is no theoretical limit for the number of messages and commands which can be transferred between the microcomputer and the decoder during a single interchange, it should be clear from the receiver main program described above that, during the call UART portion of the program, the tuning function and the keyboard polling function are not taking place. Since it is desirable for the receiver to remain in the tuning loop as long as possible, there is a practical limit on the number of messages and commands which can be interchanged between the microcomputer and the decoder during a single interchange. Accordingly, it is advisable to limit the number of messages and commands interchanged each time the UART routine is called, to approximately 10 per session. This will insure that all of the main functions of the receiver will continue to be updated.

Microcomputer 78 is capable of generating and sending messages (data signals) to the decoder of six different types. Each message includes a single data word which consists of a START bit (logic 0), 8 data bits (the least significant bit sent first), and two STOP bits (logic 1).

All data transfer sequences are initiated by microcomputer 78. The microcomputer initiates a data transfer by sending a synchronization word ("00" byte) to the decoder and then waits for a response. The decoder may start sending messages or commands to the microcomputer during this wait period. The minimum wait duration is equal to 5-bit periods. When the decoder sends data to the microcomputer, there need not be any wait period after each byte transfer. If the decoder does not respond to a message from the microcomputer within the 5-bit wait period, the microcomputer may send messages to the decoder with a wait period of 5-bit duration after each byte transfer. Any number of bytes may be transferred back and forth in this manner.

The six different data words which can be sent from the receiver to the decoder represent the channel number stored in a channel number memory location entitled CHNBIN, a status word stored in a memory location denoted FREG 1, an indication of a keystroke stored in a memory location denoted KEYBUF, the current time which includes two words—one representing the hours in binary, and a second which represents the minutes in binary coded decimal—both of which are stored in separate clock registers, a data word representing the "favorite" status of a particular channel number, and a data word representing an error.

The "favorite" status capability of the receiver functions similarly to that commonly employed in automotive radio receivers wherein the user is provided with a limited number of pushbuttons, for example five, each of which can be programmed to correspond to any selected one of the frequencies in the receivable band. By simply pushing a selected pushbutton, the preset (favorite) corresponding frequency is automatically tuned.

This is achieved in the present invention by employing a sub-routine called FAVTST which, when called, automatically interrogates a memory area in which is stored the information on "favorite" channels. When a key stroke is received which relates to one of the "favorite" channel numbers, the FAVTST sub-routine is called and the receiver obtains the information required to tune to the preselected frequency.

A flow chart of the main portion of the UART serial communication output routine is depicted in FIGS. 6A and 6B. The UART routine includes a number of routines designated as UART 1 through UART 8.

When the UART routine is called, a location in the memory denoted CHNRCD bit is cleared and the sync word or byte "00" is loaded into the work register W. Work register W comprises the transfer storage means. After loading of the sync word, the UART 1 routine will start transferring the word in register W to interface 130, by means of a sub-routine called SENDWD. The flow chart for the SENDWD sub-routine is depicted in FIG. 10 and will be described below.

After the byte in register W is transferred by means of sub-routine SENDWD, the UART 1 routine calls a sub-routine referred to as WAIT, the flow chart of which is illustrated in FIG. 9, and the program waits for an interval of 5-bits. After the waiting period, the program checks to see if any bytes have been received from the decoder. If a byte has been received from the decoder, the program goes to a routine labelled SERIN1, which causes the received byte to be entered in work register W. The flow chart of SERIN1 is depicted in FIGS. 7 and 8. If no byte has been received from the decoder after the 5-bit wait period, routine UART2 is executed.

Upon executing routine UART2, the microcomputer decides whether an error message or byte is to be sent to the decoder. The data portion of an error message consists of "00000001". If an error message is to be sent, the error message is loaded into work register W and a memory location denoted ERRSND bit is cleared. At this point, the program goes to UART1, causing the error message to be transferred.

If no error message is to be sent, routine UART3 is recalled. During this routine, the microcomputer decides whether a message (0 0 1 $K_4$ $K_3$ $K_2$ $K_1$ $K_0$) representing a keystroke is to be sent to the decoder. If the keystroke word is to be sent, the keystroke information is obtained from the keystroke buffer KEYBUF and loaded into work register W. The byte representing the keystroke information includes five data bits and these bits will form the five least significant data bits in the work register W. Bit five will be set to 1, and bits six and seven in the register W will be cleared. Data bit seven (the most significant bit) of the byte is always at 0, except when it is relative to channel number information, in which case the most significant bit will be one. After work register W is set with the keystroke word, the keystroke word or byte in work register W is ready to be sent, and the KEYSND flag is cleared. At this point, the program jumps to UART1 and the word in work register W is sent to the decoder.

If no key stroke information is to be sent, routine UART4 is called. The microcomputer decides if a channel number message (1 $C_6$ $C_5$ $C_4$ $C_3$ $C_2$ $C_1$ $C_0$) is to be sent to the decoder. If it is, the channel number is obtained from a storage location labelled CHNBIN and is loaded into work register W. The most significant data bit of work register W is set with a logic 1. Thereafter, a memory location known as CHNSND flag is cleared. Program goes to UART1 and the channel number in work register W is sent to the decoder.

If no channel number message is to be sent to the decoder, routine UART5 is executed. The microcomputer decides whether the status word (0 1 $S_5$ $S_4$ $S_3$ $S_2$ $S_1$ $S_0$) is to be sent to the decoder. The status word or byte contains bits of information which indicate: whether a particular LED on the display is flashing ($S_0$), the state of the display control ($S_1$), whether the audio channels AUDIO 1 and AUDIO 2 are being used ($S_2$ $S_3$), whether signals are being received from the satellite (Shd 4) or from VHF input, and whether the television connected to the receiver is on or off ($S_5$). The most significant bit of the status word, like the corresponding bit of all other data words except that relating to the channel number, is 0. The next most significant data bit of the status word is 1. After the status word is obtained from the status register (FREG 1) and loaded into the work register W, the bits are rotated right twice, such that they are in the proper locations. The most significant data bit is cleared (made equal to 0) and the next most significant data bit is set (equal to 1). Thereafter, a memory location known as STSEND flag is cleared. The program then goes to UART1 and the status word is transferred to the decoder.

If no status word is to be sent, routine UART6 is executed. The microcomputer decides whether a "favorite" channel status H word (0 0 0 0 0 1 $F_0$) is to be sent. If it is, the channel number is obtained from the channel number register CHNBIN and loaded into work register W. Thereafter, the sub-routine known as FAVTST is called. Sub-routine FAVTST will look at a bit map to determine if the channel number contained in CHNBIN has a "favorite" status. An indication of "non-favorite" status will be loaded into work register W. If the channel number does have "favorite" status, a different indication will then be loaded into work register W, replacing the "non-favorite" status indication. Once the appropriate bits are loaded into work register W, a location in the memory known as FAVSND flag will be clear. The program then jumps to UART1 and the word in register W will be transferred to the decoder.

If no "favorite" channel status word is to be sent, routine UART7 is executed. The microcomputer decides whether words or bytes representing the current time (as set on the receiver clock) are to be sent to the decoder. Two separate words or bytes are sent, one representing the current hours (0 0 0 1 $H_3$ $H_2$ $H_1$ $H_0$), and the second representing the current minutes (0 $M_6$ $M_5$ $M_4$ $M_3$ $M_2$ $M_1$ $M_0$). The hours are sent in binary, and the minutes are sent in binary coded decimal (BCD) form.

First, a location in the memory known as TIMSND flag is cleared and an indication of the current time in hours is obtained from the clock. This indication is converted into binary form. After, the binary form of the hours is loaded into work register W and sub-routine SENDWD (described below) is called to send the word. After the word is sent, the WAIT sub-routine (described below) is called such that a wait period of 5-bit periods is initiated.

After the wait period is over, the microcomputer decides whether any bytes have been received from the decoder during this wait period. If any bytes have been received during the wait period, an error message (0 0 0 0 0 0 0 1) is generated by setting a memory location known as ERRSND flag. If no bytes have been received from the decoder during the waiting period, the time in minutes is obtained from the clock and loaded into word register W in BCD form. Thereafter, the word representing the current time in minutes is sent to the decoder by going to routine UART1.

If words representing the current time are not to be sent to the decoder, routine UART8 is executed. First, the clock register is updated. The microcomputer then decides whether a new channel number has been received from the decoder. If a new channel number is received, the channel number display is updated by calling a sub-routine known as CHNTST. Thereafter, a memory location known as CHNRCD flag is cleared, indicating that the new channel number has been processed. At this point, the UART program terminates and the microcomputer reverts back to the main program.

As indicated above, if a byte is received from the decoder during the wait period initiated during routine UART1, the program branches to a routine denoted as SERIN1, instead of going to routine UART2. SERIN1 represents a number of serial communication input routines, the flow charts of which are depicted in FIGS. 7A, 7B, 8A and 8B.

Entry to SERIN1 occurs when a byte is received from the decoder during execution of WAIT1 routine. The byte is received from the interface and stored in a portion of the memory labelled TEMP1. The routine first causes the byte situated within TEMP1 to be loaded into the work register W. The micro-computer then decides whether this word represents a command (1 $C_6$ $C_5$ $C_4$ $C_3$ $C_1$ $C_0$) to tune to a particular channel.

If the received byte represents a new channel to be tuned, a decision is made as to whether the new channel number is acceptable. First, it is decided whether the new channel number is greater than or equal to 100. If it is, an error message is generated. If the new channel number is not greater than or equal to 100, a decision is made as to whether the channel number is equal to 0. If the channel number is equal to 0, an error message is generated. If the channel number is not greater than or equal to 100 or equal to 0, it is acceptable and the channel number is loaded into the channel number storage location known as CHNBIN. After the new channel number has been located in CHNBIN, a memory location known as CHNRCD flag is set to indicate that a new channel number has been received.

At the end of each SERIN routine, the program goes back to WAIT1. Within WAIT1, it is determined if any bytes have been received from the decoder during the wait period. If bytes have been received during the wait period, the program goes to SERIN1 again. Otherwise, the program goes to UART2.

If, on the other hand, the word stored in TEMP1 and placed into work register W does not represent a new channel number, routine SERIN2 is executed. The micro-computer then decides whether the word in work register W represents a command to set the clock and, in particular, whether the word in work register W represents a command (0 1 $M_5$ $M_4$ $M_3$ $M_2$ $M_1$ $M_0$) to set the minutes of the clock.

If the byte does represent a command to set the minutes, the micro-computer decides whether this command is acceptable. More specifically, it decides whether the minutes value represented by the byte is greater than or equal to 60. If it is, an error signal is generated. However, if the byte is acceptable, the minutes indication is converted into a binary coded decimal and stored in the minutes register known as TMINS. Thereafter, certain time counters are cleared such that the clock begins counting from the newly entered time. After clearing of the time counters, the program goes back to WAIT1.

If the word located in work register W is not an indication of minutes to be sent, routine SERIN3 is executed. The micro-computer then decides whether the word in work register W is a command (0 0 1 $H_4$ $H_3$ $H_2$ $H_1$ $H_0$) to set the hours on the clock. If the byte in work register W represents a command to set the hours, it is first determined whether this hours number is acceptable. This is done by first seeing if the number of hours represented by the byte is greater than or equal to 13. If it is, an error signal is generated. If the number of hours is not greater than or equal to 13, then it is decided whether the number of hours is equal to 0. If it is, an error signal is generated.

If the number of hours represented by the byte is not greater than or equal to 13 or equal to 0, the number of hours is converted into a binary coded decimal. This binary coded decimal number is stored in the hours register known as THRS and the time counters in the clock are cleared such that they will count from the newly stored hour indication. After clearing of the time registers, the program goes back to WAIT1.

If the word in work register W is not an indication of hours to be set, routine SERIN4 is executed. At this point, the micro-computer decides whether the word in work register W represents a command (0 0 0 1 0 $S_2$ $S_1$ $S_0$) to set the status of the display. If it does, bits 1 to 3 of the status register (FREG1) are cleared and the new status information is entered into the status register where it is used to update the status of the display. After the new information is entered into the status register, the program goes to WAIT1.

Figure 8A:
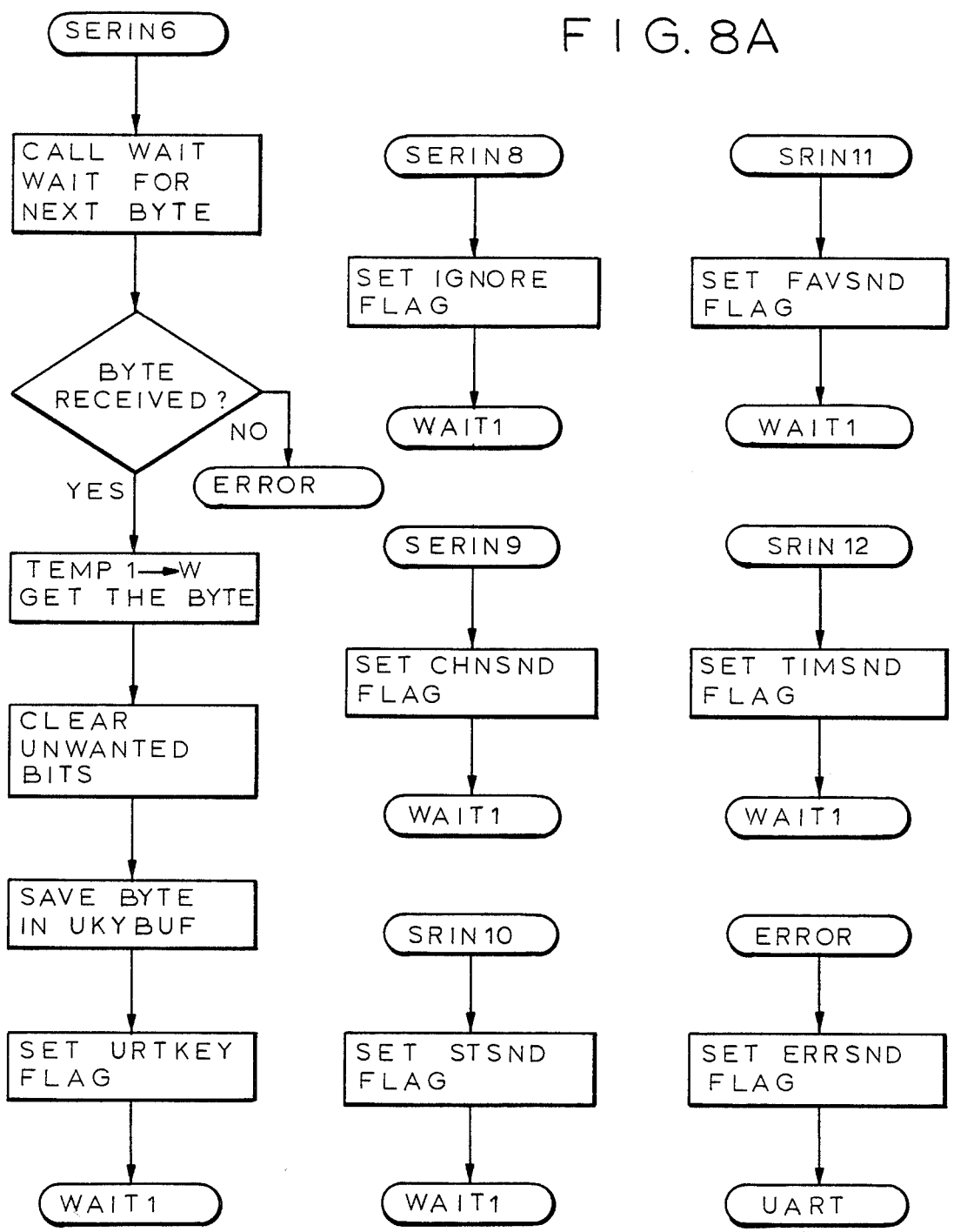

If the word in work register W does not represent a command to change the status of the display, routine SERIN5 is executed. At this point, the unwanted bits in the work register may be cleared. After the clearing operation, the program looks at a jump table and goes to one of seven separate routines, as depicted in FIGS. 8A and 8B, and labelled SERIN6, SERIN7, SERIN8, SERIN9, SRIN10, SRIN11, and SRIN12.

If the appropriate byte (0 0 0 0 0 0 0 1) has been received which indicates that the next byte will represent a keystroke command, SERIN6 is executed, the wait sub-routine WAIT is instituted, and the program waits for at least 5-bit periods. After that time, it determines if the next byte has been received. If no byte has been received during the wait period, an error message is generated. If a byte has been received at TEMP1, that byte is loaded into the work register W. The unwanted bits are cleared from work register W and the byte in work register W is transferred to a keystroke storage location labelled UKYBUF. A location known as URTKEY flag is set to indicate the presence of a byte in UKYBUF so that it could be processed later. Thereafter, the program goes to WAIT1.

Figure 8B:
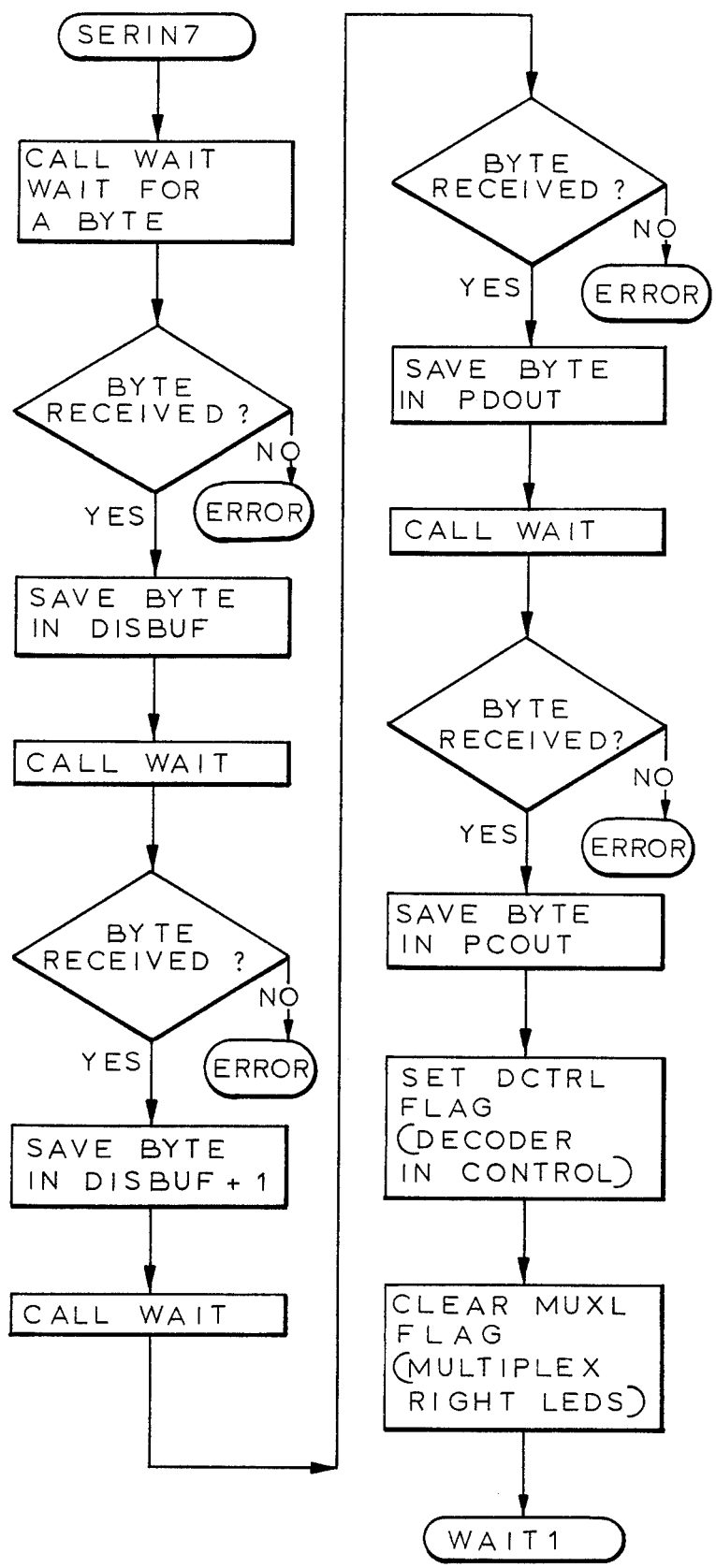

If a command (0 0 0 0 0 0 1 0) to set the display has been received, routine SERIN7 (as illustrated in FIG. 8B) is called. The display setting information will arrive in the next four bytes. First, sub-routine WAIT is called such that the program waits for 5-bit periods and then decides if the first byte has been received in TEMP1 during the wait period. If it has, this byte is loaded into a first display buffer memory location known as DISBUF. If not, an error message is generated. Thereafter, another wait period is instituted and a decision is made if the second byte has been received. If the second byte is received at TEMP1, it is stored in a second display buffer memory location known as DISBUF+1. If not, an error message is generated.

After the second byte is loaded, the program waits for 5-bit periods and decides whether the third byte has been received at TEMP1. If a third byte has been received, it is loaded into a memory location known as PDOUT and sub-routine WAIT is called once again. If not, an error message is generated. After calling sub-routine WAIT, the program then decides whether the fourth byte has been received at TEMP1. If a fourth byte has been received, this byte is loaded into a memory location PCOUT. If not, an error message is generated. Thereafter, the decoder in the control indicator, labelled as DCTRL flag, is set to indicate that the decoder is in control of the display, and a memory location known as MUXL flag is cleared, indicating that the right LEDs are to be multiplexed.

If the byte received at TEMP1 is a command (0 0 0 0 0 0 1 1) to ignore the last keystroke entered in the receiver keyboard, routine SERIN8 is executed. This routine consists of the setting of a memory location known as IGNORE flag which will indicate to the micro-computer that the last key stroke is to be ignored.

If the byte received at TEMP1 is a command (0 0 0 0 0 1 0 0) to send the channel number, routine SERIN9 will be executed. This will cause a memory location known as CHNSND flag to be set, indicating that the channel number is to be sent to the decoder. After the setting of CHNSND, the program goes to WAIT1.

If the byte received at TEMP1 is a command (0 0 0 0 0 1 0 1) that the display status is to be sent to the decoder, routine SRIN10 is called. This will cause a memory location known as STSEND flag to be set, indicating that the display status word is to be sent to the decoder. Thereafter, the program goes to WAIT1.

If the byte received at TEMP1 is a command (0 0 0 0 0 1 1 0) to send "favorite" status information, routine SRIN11 will be executed. Routine SRIN11 causes the memory location known as FAVSND flag to be set, indicating that the favorite status information is to be sent to the decoder. Thereafter, the program goes to WAIT1.

If the byte received at TEMP1 is a command (0 0 0 0 0 1 1 1) to send the time, routine SRIN12 is executed. In accordance with this routine, a memory location known as TIMSND flag is set to indicate that the time is to be sent to the decoder. Thereafter, the program goes to WAIT1.

As shown on the lower righthand portion of FIG. 8A, if an error message is generated by any of the input routines, a routine known as ERROR causes a memory location known as ERRSND flag to be set indicating that the error message is to be sent to the decoder. Thereafter, the program goes to UART.

The flow chart for the WAIT subroutine is illustrated in FIG. 9. When the WAIT sub-routine is called, the clook is updated and the wait delay constant (for example 5) is loaded into the work register W. A routine known as WLOOP (wait loop) is then executed. This routine will cause the micro-computer to make a decision as to whether a start bit of a byte has been received from the decoder. If no start bit has been received, the work register W is decremented once and a decision is made as to whether the delay period is over, that is, whether W=0. If the delay period is not over, the WLOOP routine is repeated until W=0. Once the delay is over (no start bit having been received), a memory location known as Z flag is set to indicate that no bytes were received during the wait period. Thereafter, the program returns to the portion thereof which had called the WAIT sub-routine.

If within the wait loop WLOOP a start bit is received, the program goes to a routine known as GETINP (get input). At this point, the delay constant in register W when the start bit is received is stored in a memory location known as TEMP2 and the clock is again updated. After updating of the clock, a sub-routine known as RCVBIT is called to check for the start bit again. A decision is then made as to whether the start bit is present or not. If the start bit is present, a sub-routine known as RCVWRD is called to enable the receiver to receive the byte. At this point, the memory location known as Z flag is cleared and the program returns to that portion which had called the sub-routine WAIT.

If no start bit is present, the delay constant previously loaded into memory TEMP2 is loaded back into register W and the program returns to the wait loop.

Thus, sub-routine WAIT causes the program to wait for a serial input for a minimum of 5-bit durations. If no byte is received, the sub-routine returns with Z equal to 1. However, if serial input is received during the wait period, the sub-routine returns with a Z equal to 0.

The flow chart for the sub-routine for sending a word SENDWD is shown on FIG. 10. This program sends a start bit within two cycles of entry. It begins to send a stop bit two cycles before exit. It updates the clock once and refreshes the display nine times. The byte to be sent, which consists of eight data bits, is in work register W.

When sub-routine SENDWD is called, it first causes the word to be sent to be transferred from register W and stored in memory TEMP1. It then clears a serial output port known as SEROUT. Next, the display is refreshed and the clock updated. After updating of the clock, a sub-routine known as RET15 is called. RET15 is a delay routine to set bit timing. TEMP1 is then shifted once so that the least significant bit is in the carry flag. The most significant bit is then set so that TEMP1 will be zero after all the 8 bits are sequentially moved out of TEMP1, one at a time.

The first bit (starting bit=0) from TEMP1 is now sent. After each transfer, the "carry" register is checked to see if it is clear. If it is, SEROUT is cleared. Otherwise, SEROUT is set. In either case, sub-routine RET 20 is called to set appropriate bit delay, display is then refreshed, the carry register is cleared, and the next bit is moved from TEMP1.

After each bit is transferred, a decision is made as to whether any bits remain. If bits remain in TEMP1, the send loop is repeated. The send loop is repeated until memory TEMP1 is equal to 0, indicating that there are no more bits to be sent. After all of the bits in memory TEMP1 have been sent, a delay sub-routine known as RET4 is called to adjust the timing accurately. The SEROUT port is then set indicating the beginning of stop condition. The sub-routine returns then to the portion of the UART program which originally called the sub-routine.

A flow chart of the word receive sub-routine RCVWRD is illustrated in FIG. 11. When this sub-routine is called, the memory location TEMP1 is cleared and the most significant bit of TEMP1 is set to receive eight bits. Next, the receive loop RCVWD1 is entered, which includes RET 39, a timing routine, and a receiver bit sub-routine called RCVBIT (see FIG. 12). Sub-routine RCVBIT determines if the bit received is a one or zero. As each bit is received, all other bits in TEMP1 are rotated (moved) one bit. When the carry output is equal to 1, indicating that all of the bits in the word have been received, sub-routine returns to the program which called it. Otherwise, the bit receiving loop repeats itself until all bits have been received, this being indicated by a logic 1 at the carry output.

The flow chart for the sub-routine RCVBIT for receiving a bit is illustrated in FIG. 12. When this sub-routine is called, a serial input port SERIN is set and work register W is cleared. A decision is then made if SERIN is equal to 1. If it is, work register W is incremented. SERIN is again viewed to see if it is equal to 1. If it is, work register W is incremented. SERIN is once again tested to see if it is equal to 1. If it is, the work register W is again incremented. A number 254 is added to register W. The carry bit now determines the status of the bit received at the serial input port. The program then returns to the portion of sub-routine RCVWRD which called it.

One aspect of the present invention relates to a satellite receiver which includes circuitry for performing tuning, display, and control functions and, in addition, has the capability of interacting with an addressable controller-decoder in order to exchange messages and commands with the decoder so as to alter or modify the functionality of the receiver. The micro-computer control means of the receiver is connected to a serial communication interface which permits the micro-computer to have bi-directional data signal transfer with the decoder. Through the interface, the receiver is capable of advising the decoder as to the keystroke information received from its keyboard inputs, as well as the status of the various portions of the receiver. In addition, the interface enables the receiver to receive commands from the decoder, causing the micro-computer to tune to a particular channel, to set its clock, or display, or ignore a particular keystroke. In addition, the decoder can request specific information from the receiver.

A second aspect of the present invention relates to the serial communication protocol for the receiver-decoder interface which permits the receiver and decoder to exchange information. This protocol consists of serial communications input and output routines which enable the receiver to generate, transmit, receive, and use information. The information is in the form of messages and commands which permit the receiver to modify its functionality such that the functions of the receiver can be updated as decoders of increasing sophistication and satellite broadcast signals containing additional information are employed.

While only a single preferred embodiment of the present invention is disclosed herein for purposes of illustration, it is obvious that many variations and modifications could be made thereto. It is intended to cover all of these modifications and variations which fall within the scope of the present invention, as defined by the following claims:

We claim:

1. A receiver for use with a detachable addressable controller-decoder adapted to decode broadcast signals and a television to form one of a plurality of remote terminals in a system for distributing encoded broadcast signals, the receiver comprising means for generating control signal, tuning means for selecting one of the broadcast signals, said tuning means having an output, broadcast signal output means adapted to be connected to the decoder, said broadcast signal output means being operably connected to said tuning means output for transfer of said selected signal to the decoder, means for displaying indicia, control means operably connected to said control signal generating means for receiving said control signals and to said tuning means and said display means for ascertaining the status thereof and for controlling the operation therein in accordance with said control signals, means for generating data signals for transfer to the decoder, said data signals comprising data representative of said control signals and data representative of the status of said tuning means and said display means, means for receiving responsive data signals transferred from the decoder, said responsive data signals comprising data representative of signals generated by the decoder, said control means controlling the operation of said tuning means and said display means in accordance with said decoder generated signals, upon receipt thereof, means for operably connecting the receiver and the decoder for transfer of said generated data signals from said control means to the decoder and receipt of said responsive data signals by said control means form the decoder, broadcast signal input means adapted to be connected to the decoder to receive the selected signal therefrom and means, operably connected to said broadcast signal input means for modulating the selected signal for display on the television.

2. The receiver of claim 1, further comprising means for converting said control signal into said data signals.

3. The receiver of claim 2, further comprising means for converting said responsive data signals into said decoder generated signals.

4. The receiver of claim 3, wherein said control means further comprises signal storing means.

5. The receiver of claim 4, wherein said storing means stores said control signal and, thereafter, replaces same with said decoder generated signals when said responsive data signal is received.

6. The receiver of claim 1, wherein said responsive data signal further comprise data representative of commands for said control means to generate data signals representative of one of said control signals or of a signal representative of the status of said tuning means or said display means, and means in said control means for generating data signals representative of said one control signal or of said status signal in response to said responsive data signals comprising said commands.

7. The receiver of claim 1, wherein said control signal generating means comprises keyboard means for generating keystroke signals representative of the actuation of said keyboard.

8. The receiver of claim 1, wherein said control signal generating means comprises clock means for generating clock control signals, said control means controlling said display means in accordance with said clock control signals, and° wherein said responsive data signals comprises data representative of decoder generated clock signals, said control means controlling said display means in accordance with said decoder generated clock signals upon receipt thereof.

9. The receiver of claim 1, wherein said control means further comprises means for generating a synchronizing signal, said control means waiting a given period to receive said responsive data signals from the decoder after said synchronizing signal is transferred.

10. The receiver of claim 9, wherein said control means further comprises means for generating said data signals after said waiting period, if no responsive data signals are received from the decoder during said waiting period.

11. The receiver of claim 9, wherein said control means generates said data signals after said waiting period if a responsive data signal is received from the decoder during said waiting period.

12. The receiver of claim 1, wherein said data signals comprise a data word representative of the status of said display means.

13. The receiver of claim 1, wherein said data signals comprise a data word representative of the status of said tuning means.

14. The receiver of claim 8, wherein said data signals comprise a data word representative of said clock control signals.

15. The receiver of claim 1, wherein said responsive data signals comprise a data word representative of an altered status of said tuning means.

16. The receiver of claim 1, wherein said responsive data signals comprise a data word representative of an altered status of said display means.

17. The receiver of claim 8, wherein said responsive data signals comprise a data word representative of a decoder generated clock signal.

18. The receiver of claim 1, wherein said responsive data signals comprise a data word representative of a command to ignore said control signals.

19. The receiver of claim 1, wherein each of said data signals comprises a data word comprising a start portion, a data portion, and a termination portion.

20. The receiver of claim 1, wherein said transfer of said data signals is initiated by said control means.

21. The receiver of claim 1, wherein said connecting means comprises output means and input means, said output means comprising first semiconductor means having a control terminal operably connected to said data signals generating means and an output circuit operably connected between a voltage source and the decoder, said input means comprising second seimconductor means having a control terminal operably connected to the decoder and an output circuit operably connected between said responsive data signals receiving means and a reference source.

22. The receiver of claim 1, wherein said control signals generating means comprises a keyboard, said keyboard comprising means for generating keystroke signals in response to the actuation thereof, said data signals generating means generating data signals representing said keystroke signals, said control means waiting a given period after the generation of said data signals representing said keystroke signals and, if no responsive data signals are received from the decoder during said waiting period, said control means controlling said tuning means in accordance with said keystroke signals.

23. The receiver of claim 22, wherein said responsive data signals comprise decoder generated keystroke substitution signals and said control means controls said tuning means in accordance with said decoder generated substitution keystroke signals, if said responsive data signals comprising said decoder generated keyboard substitution signals are received within said waiting period.

24. The receiver of claim 23, wherein said responsive data signals comprise data representing a command to ignore said keystroke signals.

25. The receiver of claim 23, wherein said decoder generated keyboard substitution signals comprise data representative of a substitute keystroke signal.

26. A method for controlling the operation of a receiver having a bi-directional serial data transfer capability with a detachable addressable controller-decoder, the receiver, decoder and a television forming one of a plurality of remote terminals in a system for distributing encoded broadcast signals, the receiver including keyboard means for generating control signals in accordance with the actuation thereof, tuning means for selecting one of the broadcast signals and transferring same to the decoder, indicia display means, signal storage means, control means operably connected to the tuning means and the display means to ascertain the status thereof and control the operation thereof, data signal generating and receiving means, data signal transfer means, and means for receiving broadcast signals from the decoder and for modulating same for display by the television, the method comprising the steps of:
 (a) upon actuation of the keyboard means, generating a synchronizing data word and storing same in the storage means;
 (b) transferring the contents of the storage means to the decoder;
 (c) waiting a pre-selected time period;
 (d) during the waiting period, receiving a responsive data signal from the decoder, the responsive data signal comprising data representative of decoder generated signals;
 (e) utilizing the received decoder generated signals to control the function of the tuning means and display means;
 (f) utilizing the control signals to control the operation of the tuning means if no responsive data signal is received during the waiting period;
 (g) deciding if data representative of the control signals or signals reflecting the status of the tuning means and display means is to be transferred to the decoder and, if so, generating data signals comprising data representative of the control signals or signals reflecting the status of the tuning means and display means; and
 (h) storing the data signals in the storage means and returning to step (b).

27. The method of claim 26, further comprising the steps of:
 (i) if the keyboard means has not been actuated, controlling the function of the tuning means in accordance with the previous control signals or the decoder generated signals, if the latter have been received during the waiting period;
 (j) generating a synchronizing data word and storing same in the storage means; and
 (k) returning to step (b).

28. The method of claim 26, further comprising the steps of deciding whether an error data word is to be sent, generating the error data word, and transferring the error data word to the storage means and repeating steps (b) through (h).

29. The method of claim 26, wherein the step of generating the data signal comprises the steps of deciding whether a data word representative of control signals is to be sent, generating a data word representative of the control signals, and using said data word to form the data signals.

30. The method of claim 26, wherein the step of generating a data signal comprises the steps of deciding if a data word representative of the status of the tuning means is to be sent, generating a data word representative of the status of the tuner means, and using the data word to form the data signals.

31. The method of claim 26, wherein the step of generating a data signal comprises the steps of deciding whether a data word representative of the status of the display means is to be sent, generating the data word representative of the status of the display means, and using the data signal to form the data signals.

32. The method of claim 26, wherein the step of generating the data signal comprises the steps of deciding whether an indication of "favorite" status of the channel being tuned is to be sent, obtaining the number of the channel corresponding to the control signals, generating a "favorite" data word if the obtained channel number is predesignated to be a "favorite" number; generating a "non-favorite" data word if the obtained channel number is not predesignated as a "favorite" number, using the data word to form the data signals.

33. The method of claim 26, wherein the receiver further comprises clock means, and wherein the step of generating the data signal comprises the steps of deciding if data words representing the status of the clock means are to be sent, generating an hour data word representative of the time in hours on the clock means, forming the data signals from the hour data word, generating a minute data word representative of the time in minutes on the clock means, and forming the data signals from the minute data word.

34. The method of claim 26, wherein the step of utilizing the responsive data signal comprises the steps of deciding if the responsive data signals represent a status of the tuning means in the form of a channel number, generating an error signal if the channel number is greater than or equal to 100 or equal to 0 and if no error signal is generated, using the channel number to control the tuning means.

35. The method of claim 26, wherein the step of utilizing the responsive data signals comprise the signal which represents a time in minutes, generating a data error signal if the signal represents a time in minutes which is greater than or equal to 60, converting the signal into a binary coded decimal and, if no error data signal is generated, using the binary coded decimal signal to control the display means.

36. The method of claim 26, wherein the step of utilizing the responsive data signals comprises the steps of deciding if the responsive data signals comprise a signal which represents a time in hours, generating an error signal if the signal represents a time in hours which is greater than or equal to 13 or which is less than 0, converting the signal into a binary coded decimal and, if no error signal is generated, using the binary coded decimal to control the display means.

37. The method of claim 33, wherein the step of utilizing the responsive data signals comprises the steps of deciding whether the responsive data signals constitute a command to ignore the control signal and, if so, returning to step (a).

* * * * *